US007194426B1

(12) United States Patent
Box

(10) Patent No.: US 7,194,426 B1
(45) Date of Patent: Mar. 20, 2007

(54) CUSTOMIZING AN ELECTRONIC INTERFACE TO THE GOVERNMENT

(75) Inventor: Richard Thomas Box, Chicago, IL (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/540,095

(22) Filed: Mar. 31, 2000

Related U.S. Application Data

(63) Continuation of application No. 09/258,714, filed on Feb. 26, 1999, now abandoned.

(51) Int. Cl.
*G06Q 30/00* (2006.01)

(52) U.S. Cl. .......................................... 705/26; 705/27
(58) Field of Classification Search ............ 705/26–27, 705/30, 31
See application file for complete search history.

(56) References Cited

U.S. PATENT DOCUMENTS

| 5,710,887 | A | * | 1/1998 | Chelliah et al. .............. 705/26 |
| 5,717,923 | A | * | 2/1998 | Dedrick ....................... 707/102 |
| 5,884,309 | A | * | 3/1999 | Vanechanos, Jr. ............ 707/10 |
| 6,067,549 | A | * | 5/2000 | Smalley et al. .......... 707/104.1 |
| 6,078,906 | A | | 6/2000 | Huberman |
| 6,185,683 | B1 | | 2/2001 | Ginter et al. |
| 6,205,482 | B1 | * | 3/2001 | Navarre et al. .............. 709/227 |
| 2001/0034655 | A1 | | 10/2001 | Donlavage et al. |

FOREIGN PATENT DOCUMENTS

WO    WO 95/07510    *  3/1995

OTHER PUBLICATIONS

Newsbytes, "Software For Accessing Online Gov't Info," Jul. 28, 1994, Dialog file 16 #03486181.*
Newsbytes, "InfoSpace Opens Ultimate Classifieds," Nov. 4, 1997, Dialog file 9 #01984727.*
PR Newswire, "Internal Revenue Service Selects Verisign to Secure Electronic Tax Filing," Sep. 8, 1998, Dialog file 20 #02739277.*
Johnson, Richard; "IRS—The Digital Daily," New Accountant, Feb. 1998, v13n5p. 32, Proquest #26126226.*
Proctor, Paul E.; "Catching Network Chicanery," Security Management, Feb. 1997, v41n2p. 67-72, Dialog file 13 #1035607.*
PRN: PR Newswire, "IRS E-Filing for Personal Computer Users," Feb. 19, 1998, Proquest #26482165.*
Fleming, Iain; "E-Form Makes Its Mark," The Herald, Jan. 2, 1998, 3 pgs, Proquest #59978378.*
IRA: Business Editors; "Barclays Bank and CertCo Allow UK Citizens Secure Online Registry," Jun. 17, 1998, 3 pgs, Proquest #30256762.*

(Continued)

*Primary Examiner*—Robert M. Pond
(74) *Attorney, Agent, or Firm*—Oppenheimer Wolff & Donnelly LLP

(57) ABSTRACT

A system, method and article of manufacture are provided for customizing a graphical user interface to a government system. A classification is determined of a user accessing a graphical user interface to a government system utilizing a network. Based on the classification, content available for display to the user is limited. Regional content is selected for display on the graphical user interface based on the classification of the user. The user is then allowed to customize a portion of the content available for display.

28 Claims, 19 Drawing Sheets

OTHER PUBLICATIONS

TForms: Nacinovich et al.; "Tax Software: Speed Sells," Accounting Technology, Jul. 1998, v14n6p. 40, 7 pgs, Dialog file 9 #2203993.*

BroadVision: Cohen, Jackie; "Merchant Server Market Heats Up," Bank Technology News, v10n2p. 1, 6 pgs, Dialog file 9 #1754948.*

PR Newswire; "Electronic Form Systems Announces E-Form: First "Smart" Forms Processing Software," Jul. 27, 1987, 2 pgs, Dialog file 621 #01047840.*

UU: Baker; Ronald; "Are Electronic Forms Available for Business," Best's Review, Feb. 1996, v96n10p. 86, 3pgs, Proquest #9446479.*

VV: Atwell, Robert; "New Productivity Opportunities Emerging," National Underwriter Property, n7p. 18, 3 pgs, Dialog file 148 #04525154.*

WW: Alexander, Steve; "Web Marketing Gets Personal," InfoWorld, Jan. 12, 1998, v20n2p. 93, 5 pgs, Proquest #01996649.*

*Dayco* Statement Regarding Related Applications.

\* cited by examiner

| AUTHENTICATION METHOD | EXAMPLES |
|---|---|
| WHAT THE USER KNOWS | A SECRET PASSWORD, PIN NUMBER, CREDIT CARD NUMBER AND EXPIRATION DATE, MOTHER'S MAIDEN NAME |
| WHAT THE USER HAS | AN ATM CARD, CREDIT CARD, SMART CARD, PRIVATE KEY STORED ON AN ENCRYPTED FILE ON A PC |
| WHAT THE USER IS | BIOMETRIC VERIFICATION SUCH AS VOICE PRINTS, IRIS SCAN, SIGNATURE VERIFICATION, THUMB SCAN, ETC. |

Fig. 3

CUSTOMIZING AN ELECTRONIC INTERFACE TO THE GOVERNMENT

This application is a continuation of United States patent application entitled A SYSTEM, METHOD AND ARTICLE OF MANUFACTURE FOR AN ELECTRONIC COMMERCE INTERFACE TO THE GOVERNMENT, application Ser. No. 09/258,714 filed Feb. 26, 1999 now abandoned.

FIELD OF THE INVENTION

The present invention relates to graphical user interfaces and more particularly to customization of a government-related graphical user interface.

BACKGROUND OF THE INVENTION

Compliance with government reporting requirements is a predestined activity for businesses around the world. Today, businesses fulfill these requirements by physically submitting forms by mail or in-person to a government agency, a time consuming process that, according to analysts costs them over $600 billion annually. There is a business need and a market opportunity for an electronic conduit for business to government transactions. The new system is Internet based and provides a suite of transactional and information based services to businesses.

SUMMARY OF THE INVENTION

A system, method and article of manufacture are provided for customizing a graphical user interface to a government system. A classification of a user accessing a graphical user interface to a government system is determined utilizing a network. Based on the classification, content available for display to the user is limited. Regional content is selected for display on the graphical user interface based on the classification of the user. The user is then allowed to customize a portion of the content available for display.

In an aspect of the present invention, the content may include links to at least one of services and information. In another aspect of the present invention, the portion of the information about the user may be demographic data. In a further aspect of the present invention, the content may include links to other web sites within the context of the government system.

In an embodiment of the present invention, processing of billing for transactions may be tracked so that a summary of the processing of the billing may be subsequently displayed. In another embodiment of the present invention, communication with existing business software on a system of the user may occur so that the user is allowed to access both the graphical user interface and the existing business software on the system of the user. In a further embodiment of the present invention, a mechanism may be provided for the user to access historical transactions.

DESCRIPTION OF THE DRAWINGS

The foregoing and other objects, aspects and advantages are better understood from the following detailed description of a preferred embodiment of the invention with reference to the drawings, in which:

FIG. 3 illustrates examples of authentication methods in accordance with a preferred embodiment;

DETAILED DESCRIPTION

Figure 1:
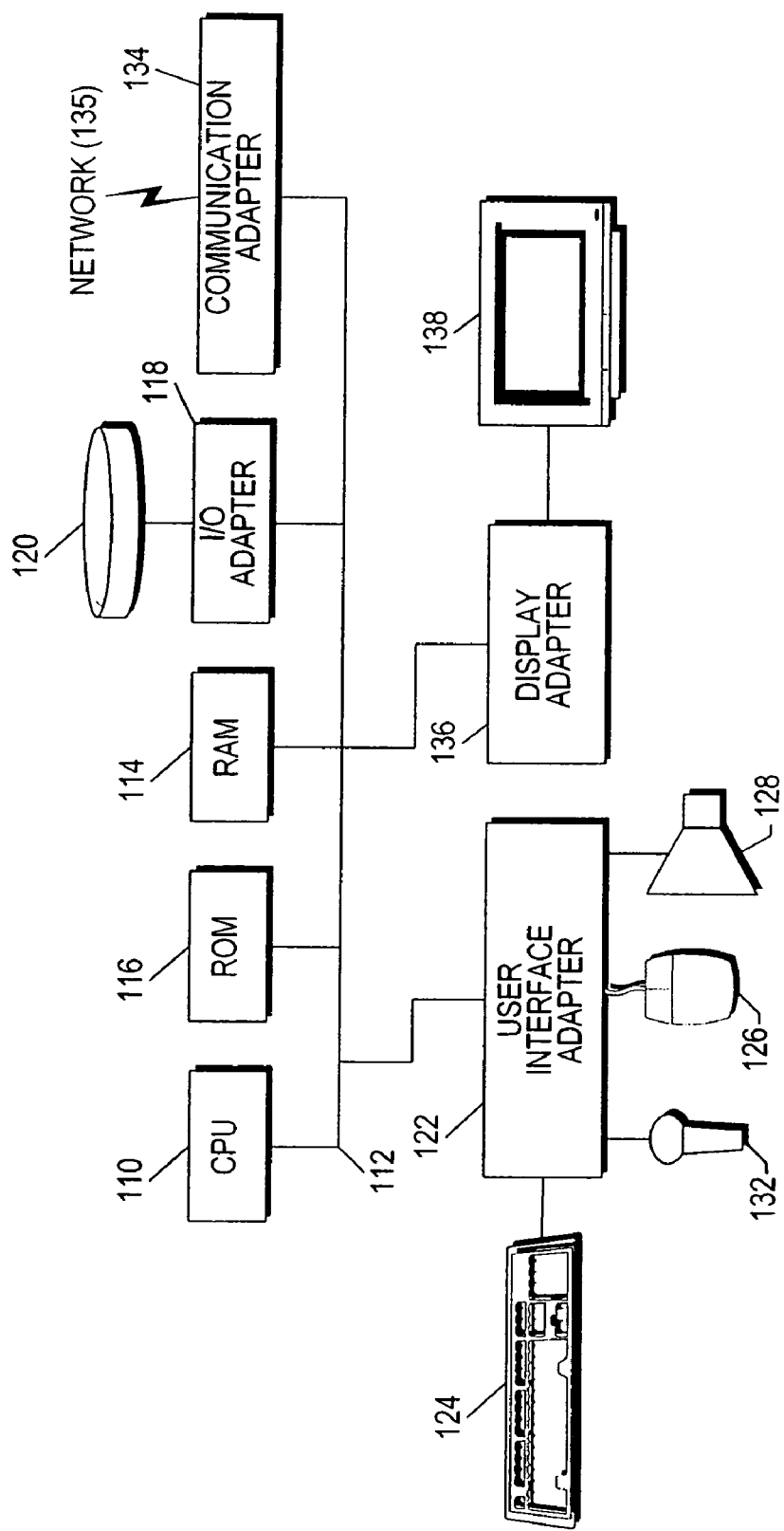
FIG. 1 is a block diagram of a representative hardware environment in accordance with a preferred embodiment.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML bas proven to be inadequate in the following areas:

Poor performance;
Restricted user interface capabilities;
Can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++ , Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

A transaction engine in accordance with a preferred embodiment is based on a Microsoft Visual Basic component developed to help design and test feedback in relation to a Microsoft Excel spreadsheet. These spreadsheet models are what simulate actual business functions and become a task that is performed by a student. The transaction engine accepts inputs and calculates various outputs and generates appropriate forms and associated supporting documents to comply with governmental requirements.

Framework-Based Reuse

Within the paradigm of framework-based reuse, a generic framework or architecture is constructed that contains commonalties. In the house analogy, one could purchase a prefabricated house framework consisting of floors, outside walls, bearing walls and a roof. The house can be customized by adding partition walls, wall-paper, woodwork, carpeting etc. Similarly, prefabricated application frameworks are available that contain baseline application structure and functionality. Individual applications are completed by adding specific functionality and customizing the look-and-feel. An example of a commonly used application framework is Microsoft Foundation Classes. It is a framework for developing Windows applications using C++ . MFC supplies the base functionality of a windowing application and the developer completes the application by adding functionality within the framework.

Framework-based reuse is best suited for capturing template-like features, for example user interface management, procedural object behaviors, and any other features that may require specialization.

Some benefits of using a framework include:

Extensive functionality can be incorporated into a framework. In the house analogy, if I know I am going to build a whole neighborhood of three bedroom ranches, I can build the plumbing, wiring, and partition walls right into the framework, reducing the incremental effort required for each house. If I know I am going to build a large number of very similar applications, they have more commonalties that can be included in the framework rather than built individually.

Applications can override the framework-supplied functionality wherever appropriate. If a house framework came with pre-painted walls, the builder could just paint over them with preferred colors. Similarly, the object oriented principle of inheritance allows an application developer to override the behavior of the framework.

Component-Based Reuse

In the paradigm of component-based reuse, key functionality is encapsulated in a component. The component can then be reused in multiple applications. In the house analogy, components correspond to appliances such as dishwashers, refrigerators, microwaves, etc. Similarly, many application components with pre-packaged functionality are available from a variety of vendors. An example of a popular component is a Data Grid. It is a component that can be integrated into an application to deliver the capability of viewing columnar data in a spreadsheet-like grid. Component-based reuse is best suited for capturing black-box-like features, for example text processing, data manipulation, or any other features that do not require specialization.

Some benefits of using components include:

Several applications on the same computer can share a single component This is not such a good fit with the analogy, but imagine if all the houses in a neighborhood could share the same dishwasher simultaneously. Bach home would have to supply its own dishes, detergent, and water, but they could all wash dishes in parallel. In the application component world, this type of sharing is easily accomplished and results in reduced disk and memory requirements.

Components tend to be less platform and tool dependent. A microwave can be used in virtually any house, whether it's framework is steel or wood, and regardless of whether it was customized for building mansions or shacks. You can put a high-end microwave in a low-end house and vice-versa. You can even have multiple different microwaves in your house. Component technologies such as CORBA, COM, and Java Beans make this kind of flexibility commonplace in application development.

The Solution: A Combined Approach

Often, the best answer to achieving reuse is through a combination of framework-based and component-based techniques. A framework-based approach for building Bus-Sim applications is appropriate for developing the user interface, handling user and system events, starting and stopping the application, and other application-specific and delivery platform-specific functions. A component-based approach is appropriate for black-box functionality. That is, functionality that can be used as-is with no specialization required.

In creating architectures to support government regulatory application development, it is imperative that any assets remain as flexible and extensible as possible or reusability may be diminished. Therefore, we chose to implement the unique aspects of applications using a component approach rather than a framework approach. This decision is further supported by the following observations.

An application can only be based on one framework. Using the house analogy, if you like the first floor of one framework and the second floor of another, it is difficult or impossible to integrate the features of the two. Or, it is so costly as to erase the benefit of using a framework in the first place. Likewise with application frameworks. You can only use one framework when building an application You can't mix and match features from multiple frameworks, so any framework that we developed would have to compete against existing and future frameworks. With components, however, you can mix and match from multiple vendors.

Components are less platform and development tool dependent, leaving more options open for development teams. An appliance like a dishwasher is not restricted for use in a particular type of house. Similarly, component technologies exist that are independent of platform and development tool. For example ActiveX can be used in almost every development environment for Windows and Java Beans components can be used on a wide variety of platforms.

Frameworks become obsolete more quickly. Rapid emergence and evolution of technology has introduced a wealth of new feature requirements into application development. Frameworks that do not include the most current features become obsolete quickly. Components typically address a more focused feature set and are not as impacted by technology advances outside their core functionality areas.

Almost half of all businesses currently use the Internet. This represents over 11 million potential clients, a number that will grow to over 20 million in the next five years. All of these businesses have statutory requirements to report taxable revenues, new hires and taxes withheld on behalf of their employees regularly to the government. All but a few of the largest businesses fulfill these requirement by physically submitting forms, a time consuming process that, according to analysts costs them over $600 billion annually. There is a business need and a market opportunity to create an electronic conduit for business to government transactions. A preferred embodiment in accordance with the invention addresses this need.

The system is an Internet based market offering that provides a suite of transactional and information based services to business. It is offered primarily as a subscription service in large states—Texas, California, New York, Illinois, Ohio and Florida—where the number of businesses is sufficient to ensure profitable revenues at the anticipated levels of market penetration.

Market research indicates that the business community is eager to conduct business with the government electronically although, as in all new service offerings, many potential clients will only subscribe after the service has been tested and proven. Approximately 10% of the businesses surveyed, indicated that they would subscribe to a service as soon as it was offered with another 25% expressing willingness to subscribe after the service had been proven—probably within six months of implementation. These numbers were used to derive the market share projections for the system—7% in the first year, 20% in year 2 and 40% in year three—in each of the target states.

Introduction

Of all the potential opportunities for eCommerce, few are greater than the mandatory exchange of information between governments and business. Yet few governments have the internal capability, or motivation, to seize these opportunities. The Business Service Center has been designed to meet this challenge. The Business Service Center (BSC) is an Internet-based service that simplifies and streamlines the necessary interactions between businesses and the government agencies with which the business has a reporting relationship.

The BSC Mission: to be the engine for economic development and the first choice of businesses and government agencies for enabling business-to-government interaction and information exchange. Meeting the statutory requirements of government has always been a challenge for the average business. Each agency has different requirements and each sees the business as a different entity. This usually results in the business completing numerous forms—with much of the information common to each form—and submitting them by mail to the appropriate agency. Government agencies, on the other hand, are compelled to process thousands of forms with the attendant data entry costs and errors associated with data entry. Given the number of agencies and levels of government that most businesses must deal with, and the number of business filings that each agency must process, compliance is an expensive and time consuming process for both government and business.

The system in accordance with a preferred embodiment provides an electronic conduit through which the business can interact with government. The business is able to file reports with all of the correspondent agencies—including payments—without needing to re-key demographic or unchanged information. Government agencies is able to receive data electronically, eliminating data entry and the associated errors, and accept payments without needing to manually process checks or deposits. Perhaps more important for the business, is an electronic confirmation of both the filing and the payment, something that is not currently available from most government agencies. The BSC Vision: to reduce the direct and indirect costs of regulatory compliance for both business and government by streamlining the filing processes, reducing paperwork, serving as a single point of contact for the routing and tracking of multiple types of filings, facilitating communication and providing greater access to government information on-line.

The system provides substantially greater value over existing government web services because it:

Provides a single point of contact when dealing with multiple government organizations Alleviates the problem of having multiple tax or business identifiers Eliminates the need to re-enter information that could be stored electronically and used to pre-format frequent filings Enables the user to file and pay simultaneously in the same transaction Provides a functionally robust, secure, industrial strength web site that can be accessed by any type of browser The system is a solution for businesses that are looking for ways to:

Interact with government electronically without making large investments in systems or equipment Reduce their indirect costs of compliance by reducing manual processes, paperwork, and redundant filings, and by avoiding costly penalties for late filings, underpayments, and non-compliance Have expanded access to government services and programs targeted to the business community The system is a solution for state agencies:

That are looking to provide their customers with electronic access to services

That do not have the in-house capabilities to build or operate a transactional web site That have a significant investment in legacy systems, and cannot redirect their efforts without compromising their Y2K re-mediation projects Whose political leaders need to focus on economic development issues and creating a business-friendly environment Whose employees would resist change, and be threatened by large scale efforts to streamline government processes and reduce operating costs BSC Market Research There are three elements to the argument that the system is a good idea whose time has come:

Market research results;

The growth of the Internet as a channel for business transactions; and,

The universal requirement for compliance with government programs. In the summer of 1998, Lawrence Research conducted 10 focus groups of small business owners, and 2 groups of accountants to understand the compliance and filing issues facing businesses today. Eight of the ten focus groups featured a version of the system prototype which was used to illustrate the concept, and solicit feedback on the design.

The following features are provided to assist businesses in interfacing with government offices in accordance with a preferred embodiment.

1. Tax Filings—report sales taxes, withholding taxes, business income taxes and other taxes electronically.

2. List of Requirements—in one place find everything that state government agencies require of small businesses, including forms which can easily be downloaded and printed.

3. Tax Payments—pay employee withholding, sales taxes and business taxes electronically, and you control when the payment is made.

4. Notification of Receipt—electronic verification of receipt of documents and/or payments with a confirmation number from the agency in point, sufficient for audits.

5. Notification System—an automatic reminder or tickler system that alerts the business when upcoming reports or filings are due.

6. Permits and Licenses—submit applications for permits and licenses electronically.

7. Regulations—look up all health and safety regulations that apply to a particular business.

8. Employee Search—post job openings, receive information about available job seekers and their skills, and search for matches against available qualified candidates by zip code or area code.

9. Audit Trails—print out forms, filings and agency verifications of receipt from an automatically assembled transaction history file.

10. Concurrent Data Visibility—allows the business owner and accountant or partner to both look at the same screens from separate computer monitors.

11. Pre-Filled Forms—for reports that must be filed weekly, monthly or quarterly, the form will pop up with certain fields already filled out based on previously submitted information, thus eliminating the chore of filling out repetitive answers.

12. Small Business Marketplace—do business-to-business activities that are currently being done by phone, fax or in person, including buying from vendors and selling products direct to market. This includes directories similar to Yellow Pages for small businesses, classified ads, RFPs from government agencies and others, etc.

13. Business Registration—register a business or provide required business information updates. Enter the information once and it is automatically sent to all state agencies requiring that information.

14. Small Business Search Engine—the system acts as an Internet search engine to find information needed for to address business problems. Because it is geared primarily for small business, it eliminates excessive searching through the hundreds of references provided when using the typical Internet search engines.

In addition to market research that provides a compelling endorsement of the system services and the basis for its revenue projections, it is important to consider additional factors in the growth and acceptance of the system. Increases in Internet usage and trade have been exceptional over the last 3 years. It is expected that this growth will continue, if not increase, over the next few years. The system differs from the majority of Internet service offerings because it provides a channel for a mandatory requirement whereas most services are discretionary. If the system provides the most cost-effective channel for a mandatory requirement, there is every reason to believe that the market share for the system is very high. One additional factor—a positive wild card—is the impact of the year 2000 on government agency systems. Because the system provides a Y2K compliant audit trail for business filings to government, there may be a much higher than anticipated subscriber base at the end of calendar year 1999.

Scope of Services

Business-to-Government Transactions

While there is a wide range of transaction types that can be supported by Internet filing, the system has targeted for the initial releases, transactions that are common to all businesses, required on a regular and sometimes frequent basis, and are simple enough to be completed during an Internet session. Examples include wage reporting, sales and withholding tax, and new hire reporting. As the system gains market share, and establishes a capability for rapid product deployment, additional transaction types is added in a series of future releases.

The types of transactions that are added in new releases is determined by on-going market research, customer feedback, and the strategic direction of the system. The decision process includes an analysis of the cost to add new functions in current and planned state launches, compared to the projected income that the system may derive through increased use and market share. In general, new functionality is added in any combination of three scenarios: Expanding functionality within an existing system interfacing agency. For example, the interface with the Department of Revenue, which at the outset may only include sales and withholding taxes, could be expanded to include other tax types, or even permits and licenses that are processed by that agency.

Expansion to additional government agencies beyond those initially targeted. Examples could include OSHA, EPA and Workers Compensation;

Expansion of the system into other levels of government—municipal, county, etc. Given the fact that businesses must deal with both state, federal and local compliance issues, this form of expansion will add significant value to system users. However, the number of local municipalities combined with the relative absence of technology, will make this effort a long term challenge.

The market research suggested offering system transactions in a pricing model similar to cable TV, whereby a monthly subscription fee would include unlimited use of a "basic" set of transactions, while other transactions, called premium, would be paid for on an as-used basis. The basic transactions are those that the government requires on a regular schedule e.g. sales tax, while premium transactions are triggered by a business event e.g. new hire report, or worker's compensation claims.

The table below lists the transaction types supported in accordance with a preferred embodiment.

| Transaction Type | Basic or Premium |
| --- | --- |
| State Sales Tax | Basic |
| State Withholding Tax | Basic |
| Quarterly Wage Reports | Basic |
| Registration | Basic |
| New Hire Reporting | Premium |
| Federal Income Tax Withholding | Basic |
| FICA Withholding | Basic |
| Job Match | Premium |
| Training Placement | Premium |
| UI Claim Notices and Employer Protests | Premium |
| Worker's Compensation Accident Reports | Premium |
| Environmental Reporting | Premium |
| Workplace Safety Reports | Premium |
| Permits and Licenses | Premium |

Functions and Features—Differentiating the System from Other Internet Filing Solutions Although most government web sites today are limited to published information or simple interaction, it is expected that within the next two to three years, government agencies will offer some form of Internet filing.

The private sector is already moving into this market. Today, some payroll companies and tax processors offer filing services on behalf of their clients and plan to enter the Internet market. Both represent competition for the system. However, what differentiates the system in the market is that only the system offers filing and payment capabilities for numerous government agencies across a variety of transaction types through a single, simple access point.

The system is further differentiated by the following features:

Pre-filled forms containing demographic data and pre-existing information;

Notification of receipt for both payments and filings;

Audit trails for transactions;

Payment processing including post-dated or partial payments;

Integration with existing business accounting software (later releases);

On-line help;

On-line account inquiry for both static data and previous transactions;

Document search and download for standard government forms; and,

Directory services for both government agencies and other business clients.

Other functions and features of the system are seen in the system web page including:

The ability to differentiate between types of users in the determination of the services and information accessible;

Log on capabilities that allow users to access both system services and their own system attributes and data;

The ability for users to customize the system front page so that they can navigate through the services without needing to deal with options or information that they have no interest in;

The ability for the system to customize the front page on a regional basis presenting sponsor's information and content for the user and the locale. For example, all users might be presented with a national sponsor's content, but only Illinois businesses would have visibility to Illinois based sponsor's information and content.

The functional applications that are developed for the system include the ability to:

Register users with the system to track and complete regular billing for transactions;

Link system users to other Web sites within the context of the system;

Gather, validate and edit data for inclusion in both reports for submission to government agencies and for the customization of the user profile;

Track transactions and pieces of transactions so that the appropriate audit trails are created. One example is the requirement to track a payment transaction independently of the related filing with the ability to connect the two for audit trail purposes; and, Provide a mechanism for users to access historical transactions.

Database applications for the system:

Capture and maintain user profiles and demographic information;

Assign and translate the system users identifier to a variety of identification numbers previously assigned to the business by corresponding agencies;

Store and maintain agency data requirements for all system reporting and filing services;

Capture, translate and retain a user's reports and filings to create a full system user history, including associating payment authorization data with the filing;

Retain billing histories; and,

Maintain system content libraries in those cases where system content providers have contracted with the system to do so.

Given current concerns about Year 2000 compliance in many government agencies, system will also offer the business confidence that any transactions after the turn of the millennium is submitted and tracked, even if problems occur with the agency systems in receiving or accepting them.

System Breakaway Strategy—Other Capabilities that Add Value and Increase Market Share A system in accordance with a preferred embodiment increases the value added to both the business user and government agencies by:

Creation of marketspace opportunities for system users and sponsors to offer products and services and to share information with each other;

Integration of system links into business accounting packages so that businesses can file with government without transferring data from their in-house systems;

As the sales of products and services through the system marketspace is implemented, database applications is required to capture and store the information necessary for the system to derive and assign commission or referral revenues;

The ability to gather data abstracts and usage patterns—stripped of any client specific information—and to mine that data for new applications, alliances for value added opportunities;

Use of the critical mass of system clients to create buying cooperatives for the benefits of all system clients;

Creation of advertising and promotional opportunities and revenues targeted at system clients as the size of the system subscriber base becomes attractive to advertisers;

Creation of external access to the system 'marketspace' and the development of a system services catalog where system clients can offer their products and services across the entire network; and, Re-branding the system Internet product as the foundation for other products or Internet based market offerings—"the system inside".

System Architecture Effort

A flexible product development approach is better suited for the system. A flexible product development approach embraces change during the product development effort. Within the same overall lead time to market introduction as a traditional sequential development approach, a flexible development approach can deliver several beta iterations of the product. Each beta iteration would help sense the market needs better, to test the effectiveness of technical solutions designed, and to better integrate customer and market needs with the technical solutions. Research has shown that a flexible product development approach can provide a significant competitive edge in the emerging new markets.

Assessing Customer and Market Needs

Research shows that products developed using direct customer participation in the design and development process are more successful than the ones which are developed keeping customers at "arms length" during this process. The way in which customer involvement is included matters. Focus groups, usability laboratories, and other contexts of traditional market research, while useful, are not conducted in the customer's own environment. On the other hand, empathic design approach uses observation of the customers using products and services in their own environment. The flexible product development approach, with its successive beta implementations, should include the empathic design approach to assess customer and market needs. This applies to both the customer-facing website side of the product and the back-end government-agency-facing side of the product offering. Enlisting key initial business customers and government agencies which would participate directly in the product design and development effort is essential for the successful development of the system product.

The Integration Process

A modular approach to the system product development is highly recommended. From a modular product development perspective, there are two major components to the system product:

the core system engine component, and the government agency integration component.

Research findings would support the system product development efforts being clearly divided into two parts also:

the core system product development effort, and the government agency integration effort.

The system separates the core product development team from the Integration Teams (I-Teams) which performs the integration with the government agencies. In this model, while developing the product feature set, the core product development team would define the architectural elements for the core product which include providing well-defined interfaces for the government agency integration. The I-Teams operate independently to design and implement integration modules, consistent with the system architecture, which links government agency information systems to the system engine.

The success of this product development model depends on the freedom and the flexibility given to the two efforts. The core product development effort must strive, under free market forces, to provide the best product feature support and a well-architected back-end interface to government agencies which is responsive to free market needs. The I-Team effort must strive to successfully complete government agency integration while complying with the architected system back-end interface. The operation and communications model for these two efforts must allow for the system business model to accommodate third-party I-Teams if the system should choose to do so in the future.

Integration Teams

Each government agency has information requirements that differ in some way from similar agencies in other jurisdiction or different agencies in the same jurisdiction. Differences include the type of data, the format of reports, the structure of the data itself (for example, client identifiers) and the basis on which rates are applied or remittances are calculated. The system does not intend to create a custom solution for every government and agency. Rather, integration is achieved through a superset of information developed by agency type. For example, the system database for Department of Revenue transactions include all of the data required by all of the Departments of Revenue corresponding with the system—preliminary research indicates that, with the exception of formats and data structures, there is little difference in the information requirements between governments. Integration teams determine the information requirements of the target agency and the system reformats submission from the standard to meet individual agency requirements.

Integration Teams (I-Teams) complete implementation of the system for government facing applications in each of the jurisdictions. The I-Teams are made up of three resource components:

Relationship management;

Agency specific point skills; and,

Technology integration skills.

Run Services

Internet Service Provider (ISP)

System clients are dependent upon an Internet Service Provider (ISP) to provide them with a connection to the Internet. The system must also establish connections with its clients either by becoming an ISP or contracting with an ISP for those connections. The long term reputation and credibility of the system is dependent, in part, on consistently available access to both the network and to system services. The options range from becoming an Internet Service Provider (ISP) for system subscribers to sub-contracting all of the operational requirements—with the exception of relationship and alliance management—to an existing ISP. For many of the reasons detailed in the following sections, contracting with an existing ISP is the lowest risk alternative for the system.

There are several companies—Sprint, AT&T and GTE among them—that have the reputation, the expertise and the reach to provide the combination of Internet connectivity and web, application, and database hosting. At a minimum, the following functions are required from an ISP. Management of these functions would be governed by a Service Level Agreement between the ISP and the system. They include:

Acquisition of hardware and software for web, application, and database servers;

Operation and maintenance of web, application, and database servers;

Routine backups as well as failure and disaster recovery;

Provision of high-speed, redundant connections to the Internet;

Performance monitoring of all servers and network connections; and,

Virtual Private Network capabilities for interface to state agencies.

Digital Certificate Authority

All subscribers are issued digital certificates which serve two major purposes. The first allows the system to authenticate the identity of subscribers prior to accepting transactions or allowing access to files or information held in confidentiality for the subscriber. The second allows subscribers to provide a legally binding digital signature that does not rely on pen or paper and provides certain identification of the subscriber as the signatory on all transactions submitted through the system. The certificate replaces the personal signature as an effective form of identification.

Digital signature technology is a fairly recent development. Digital signature legislation has either been recently enacted or is pending in most states. The standards for this legislation could potentially vary between states. The system has constructed its digital signature certification standards on what is believed to be the most rigorous of the enacted or pending requirements. It is expected that the system standards is acceptable in all of the target states and are acceptable in those states where legislation has already been enacted. An entity called a Certificate Authority (CA) uses specialized software to create, maintain, and manage digital certificates. The CA may be administered directly by the system or by a third party who provides CA services to the system and its subscribers. The CA issues digital certificates as part of a registration process. This feature allows new subscribers to access system services. This process validates a new subscriber's request to participate in a system, generates a unique identifier, binds that identifier to the subscriber, and distributes the identifier to the new subscriber.

Security

Since the system acts as the intermediary between businesses and government offices, communicating financial and proprietary information, maintaining data security and integrity is a major concern. This section describes the technical architecture and business processes used to safeguard the security of system data. system security must be established through a combination of technology and procedures that is addressed by all of the entities that use system. By itself, system cannot solve every security issue involved in using the Internet for electronic commerce. However, the elements of security provided within this and related documents, in combination with a comprehensive security policy and sound implementation procedures, can facilitate on-line commerce while reducing to a manageable scale the risks involved. Information security experts look for ways to achieve two fundamental goals with respect to information: confidentiality and integrity. Confidentiality is the ability to prevent the disclosure of information to anyone not authorized to see it, and integrity is the ability to prevent the unauthorized modification of data. These two objectives are certainly important to system subscribers and all threats ultimately undermine one or both of these goals.

For the system subscriber, confidentiality means having assurance that proprietary information like employee salaries and company revenues are not revealed, either while stored on system databases or in transit across the Internet. Integrity means having assurance that the documents that system subscribers produce (and sign) does not be modified after they are created. The blueprint of system has kept these goals in mind from the earliest days of its conception. The system design has taken a number of steps to deal with those concerns:

- The systems are capable of supporting Internet applications and provides authentication, access control and audit features that have been exhaustively examined and rigorously tested;
- Access and authentication are controlled by digital signature certification;
- System logs track every transaction in a manner that is easily auditable;
- Firewalls at the system/Internet boundary restrict access to legitimate system subscribers
- Public key encryption as a mechanism to ensure that data passing through the public network cannot be readily deciphered even if it could be captured; and,
- Application security that limit authorized users to their proper domains.

The security architecture of the system is designed in three layers:

- Network security: This layer considers the security of system as a collection of computers connected to the Internet. The use of firewalls, filters and routers and their proper configuration are used to prevent unauthorized access by non-subscribers. Like any other Web-based application, the system presents an interface to its customers on the publicly accessible Internet. Unlike "virtual storefronts" that sell books and CD's, however, the system does not welcome anyone that happens to walk by to come in and browse. In order to enter the system, a user must present a credential that identifies him as a system user first. Public-key technology that safeguards the integrity of each transaction is also used to authenticate the user to the system server and the system server to the user
- Application Security: The use of Microsoft NT mechanisms and structures to address the need to prevent valid users from accessing certain system resources after they have been authenticated Since the system is not a publicly available application where anonymous users are allowed to browse, users access must be constrained to their own data. The security challenge in a multi-tiered, distributed system whose architecture is focused on speed and transaction throughput is ensuring that no data access succeeds unless an authorization check verifies its validity. The fundamental components of the system architecture are integrated to keep track of users and resources and ensure that users only have access to their own data regardless of where that data resides.
- Document Security: System has unique requirements for the security of user documents. The use of public key cryptography to meet these requirements is managed through establishment a broad set of roles and responsibilities to which the involved parties subscribe to realize the benefits of digital certificates. This set of roles, processes, software and services enables the use of public key cryptography and certificates in a distributed computing system.

The sum of these security layers—network, application, and document, ensure that the system provides as much confidentiality and integrity as can reasonably be provided currently in an Internet environment.

Business Development

The financial success of the system, in both the short term and long, is largely dependent on the efforts of its allies and the willingness of governments and government agencies to endorse and cooperate with the system implementation and integration.

Business development activities involve making initial contacts with key stakeholders in target states, and developing and maintaining those relationships as required by the business model in place. Included in the list of key stakeholders are:

- Governments—at the political, agency executive and operational levels—because the number of cooperating agencies enhances the value of the system to subscribers;
- Chambers of Commerce—at the federal, state, and in some cases, local levels—because they is the primary sales vehicle for adding system subscribers;
- Content providers who can add value to the system for its subscribers.

There are other entities that interface with the system ranging from contracted services such as web hosting and data centers, to new strategic alliance partners. Management of changes at all of these levels must be formalized to ensure that issues from all system participants are prioritized and addressed in a timely and effective fashion. Relationship managers are the advocates for their charges in the establishment of priorities for system enhancements and changes.

Program Management

Implementing the system and coordinating the introduction of products, the administration of budgets and performance metrics, staffing and project control are all part of the overall program management function for the system. The chart below identifies the timelines associated with the implementation of the system through the expansion phases.

Member Services

Much of the effort of the system must be directed at subscribers to ensure that service levels and the performance of the system meet or exceed their expectations.

Subscriber Services

There are three primary elements to the subscriber support model that have been identified:

Registration;

Billing; and,

Problem Resolution.

Registration services are provided on-line. Subscribers are asked to provide demographic information and credit card/bank account authorization for system billing purposes. Subscribers are asked to read and acknowledge the Subscriber Agreement detailing the terms and conditions of a system subscription as well as acknowledging the risks inherent in Internet transactions and limiting system liabilities in the event of service defaults, disruptions, or failures. Later, when new subscribers come from a less experienced segment, other registration mechanisms may be required, however, since a call center is more expensive to administer, every attempt is made to channel new subscribers through other means. Even when initial registrations are taken telephonically or by mail, the subscriber will still be required to acknowledge and accept the Subscriber Agreement.

Credit card billing is authorized with the appropriate clearing house and instructions issued to the Certificate Authority to issue a digital signature certificate to the new subscriber. Digital certificates are delivered to the client by mail. Acceptance of the certificate at a physical address adds a further level of security to the process. The subscriber should be able to conduct business on the system within a few days. Billing is automatic and applied against the subscriber credit card or bank account either monthly or annually at the subscriber's direction. Payments continue automatically until the credit card clearing house rejects the payment or the subscriber requests that the service be terminated. In the event of the former, the subscriber is notified by e-mail of the credit denial and given an opportunity to rectify the situation. Should that not occur within a pre-determined grace period—five working days—the subscriber account is put on hold and the subscriber warned of impending termination. Should the subscriber not comply within 20 days, the account is terminated and further access denied.

Subscriber bills may change from month to month—if there are premium services utilized. To avoid subscriber confusion and questions, a monthly statement is forwarded to the subscriber through e-mail itemizing the transactions for the previous month and acknowledging the payment through credit card or bank account. Problem resolution occurs at a number of levels. The first levels occur within the system software itself. Frequently Asked Questions (FAQ) are itemized and posted for use by subscribers. On-line help features are provided at two levels; at the application and field levels. Should the on-line help and FAQ be inadequate to assist the subscriber needs, additional support is available.

Additional support is provided either through direct dial to a call center or through an e-mail response or call back mechanism. Should additional support be provided through a call center, the number would be posted on the system in the on-line help area. Assistance would be provided at three levels:

Real time solutions are provided at the first point of access for 85%–95% (service level target) of problem requests. Solutions are provided from a list of common problems through a call center specialist with minimal system training. Should the first point of access be unable to address the problem from the list of common problems;

Less common problems are referred to a system specialist at the call center. These problems may take a little more time to solve and require a higher degree of training to support. This 'second line' should be able to solve all but a few of the remaining problems, should the system specialist be unable to solve the problem;

Remaining problems are referred directly to the system designers and developers with the subscriber receiving an acknowledgment of the referral and an e-mail response when the problem is solved.

Additional support could also be provided through an e-mail call back system. Subscribers would submit their problem to the system electronically and a service agent would call the subscriber back to address the problem. Research has not yet been concluded to determine which of these alternatives—call center versus e-mail and call back—is the most cost effective service alternative, however, no investment in this type of service is made until the volume of subscribers needing additional help resources reaches critical mass.

Payment Processing—Integration with Financial Institutions

The system is integrated with a financial institution to provide the following services and transactions:

Authorization of credit card charges for system billing purposes;

Processing of electronic funds transfer requests between system subscribers and government agencies;

Return of payment confirmation records to the system for system subscriber initiated transfers; and, In future applications, the processing of payments and/or credit cards in the sale of products or services in the system marketspace.

Interface with financial institutions is through generally accepted protocols in current use by the financial institution for transactions of this type.

SECURITY DETAILS

Introduction

A system in accordance with a preferred embodiment includes a web-based service that allows business owners to interact with Government agencies in a variety of ways. The goal of the system is to diminish paperwork and reduce the cost of regulatory compliance. The system serves as an intermediary between businesses and government agencies to facilitate such actions as registration, permits and licenses, job placements, taxes, and workers compensation filings.

As such, the system is an electronic commerce application, albeit one more complicated than the typical virtual storefront. Since it acts as the intermediary between businesses and government offices, communicating financial and proprietary information, the system must assume the major responsibility for providing adequate security. This document describes the technical architecture and business processes used to ensure the security of system data.

System security must be established through a combination of technology and procedures that is addressed by all of the entities that use system. By itself, the system cannot solve every security issue involved in using the Internet for electronic commerce. However, the elements of security provided within this and related documents, in combination with a comprehensive security policy and sound implementation procedures, can facilitate on-line commerce while minimizing the risks involved.

Background

Paradoxically, the most common sort of eCommerce application, the virtual storefront, served to publicize the issue of internet security, even though the threat to the typical consumer mentioned in that context are inconsequential. As popularly reported, the open nature of the Internet allows users' credit card numbers to be stolen. But since cardholder liability for fraudulent transactions is limited to fifty dollars (and is usually waived) the cardholder has as little to fear from the Internet as they do from a dishonest waiter in a restaurant. Open networks do facilitate the wholesale collection of such information, however, and the disclosure of large numbers of credit card numbers represents a serious threat to the card issuer, so the protection mechanisms created for credit card numbers seem better designed to protect the credit card vendors.

In the physical world, security is achieved with locks, alarms, guards and security cameras. As anyone who has ever considered the security needs of his house or business realizes, there is no point in securing a modest house with the sort of security appropriate to a jewelry store or a bank. But anyone responsible for a bank's assets who thinks only of locks and alarms and fails to consider forgers and scam artists isn't doing the whole job. Analogously, in order to create strong security systems for the system, we must answer two fundamental questions:

What are the assets we are trying to protect and

What are the threats to those assets?

Information security experts look for ways to achieve two fundamental goals with respect to information: confidentiality and integrity. Confidentiality is the ability to prevent the disclosure of information to anyone not authorized to see it, and integrity is the ability to prevent the unauthorized modification of data. These two objectives are certainly important to system customers and all threats ultimately undermine one or both of these goals.

For the system customer, confidentiality means having assurance that proprietary information like employee salaries and company revenues are not revealed, either while stored on system databases or in transit across the Internet. Integrity means having assurance that the documents that system customer produce (and sign) are not modified after they are created. The blueprint of system has kept these goals in mind from the earliest days of its conception.

Network security: This section discusses the security of system as a collection of computers connected to the Internet. The use of firewalls, filters and routers and their proper configuration are discussed here.

Application Security: In this section, the use of Microsoft NT mechanisms and structures to meet the security requirements is described.

Document Security: The system has unique requirements for the security of user documents. The use of public key cryptography to meet these requirements is described in this section.

Implementation Approaches

The system employs what is becoming a classical architecture for web-based, database-intensive applications. Commonly referred to as a three-tier architecture, this approach uses a client, an application server and a database. The middle component isolates the user from changes to the database structure and bundles transactions for greater efficiency. From a security perspective, the challenge of a three-tier architecture comes from maximizing the efficiencies of the three-tier approach while maintaining the user accountability essential to good security.

Windows NT Security

When designing an application like the system, designers are very quickly faced with the decision about what major platforms to rely on. One can choose one of the many variants of the UNIX operating system or Windows NT. The system has decided to rely on an NT-based solution in part because of the designers' confidence in the strength of its security design.

The Windows NT operating systems version 3.5 was evaluated by the National Computer Security Center in July of 1995 and awarded a C2 rating. Version 4.0 is currently under evaluation against the same criteria and is scheduled to complete testing in the last quarter 1998. Although no operating system evaluation can ensure that every application using that system is secure, it does lend assurance that the mechanisms that provide authentication, access control and audit have been exhaustively examined and rigorously tested.

The Windows NT platform has been designed from its inception to be a secure operating system. It includes graphical administration tools that allow administrators to easily manage discretionary control and monitor all relevant security information for the operating system.

The Windows NT platform also provides the ability to write security-relevant information into a security log to allow administrators to monitor their secure systems. The Windows NT security model allows application designers to apply access controls to all system objects. Before an application or process can open a handle to any object, the Windows NT security system transparently verifies that the process has the appropriate authorization. The Windows NT platform ensures that no process can access a file unless the file's owner or a system administrator permits it.

For the system, the use of NT with Microsoft middleware and database products facilitates the integration of front end, middle tier and back end and enhances security. Security features extend beyond the limits of the operating system and include the other products and services running on it. All of the MS BackOffice products, such as IIS and SQL Server can plug into NT to get details of the files and resources that each user should have access to. One major benefit of this design is that users are only authenticated once, through their digital certificate.

Other Possible Platforms

Although the current design focuses on Microsoft products, many successful and secure web sites have been built using other platforms. Several versions of the UNIX operating system have also received accreditation from the NCSC, as have Oracle database platforms. They too, can be counted on to enforce the fundamental security requirements. The forgoing is not meant to suggest that if future considerations indicate that the current Microsoft-centric approach should be modified, it is impossible to ensure the security of system systems. This report emphasizes Microsoft products because they have been the focus of the design team's deliberations to date.

Fundamental Security Requirements

There are fundamental security requirements that should be present in any data processing environment. In the following section we define these objectives generically and then discuss how these requirements must be satisfied in the context of the system.

Identification and Authentication (I&A)

An identifier is a piece of data used to uniquely identify an entity in a transaction. Real world examples of identifiers include a drivers license or a national identification number. Identifiers must possess the following characteristics:

Uniqueness: Each entity must have a unique identifier. No two entities have the same identifier.

Association: There must be some way to bind the identifier to the entity (e.g., tying a social security number back to an actual person.)

Figure 2:
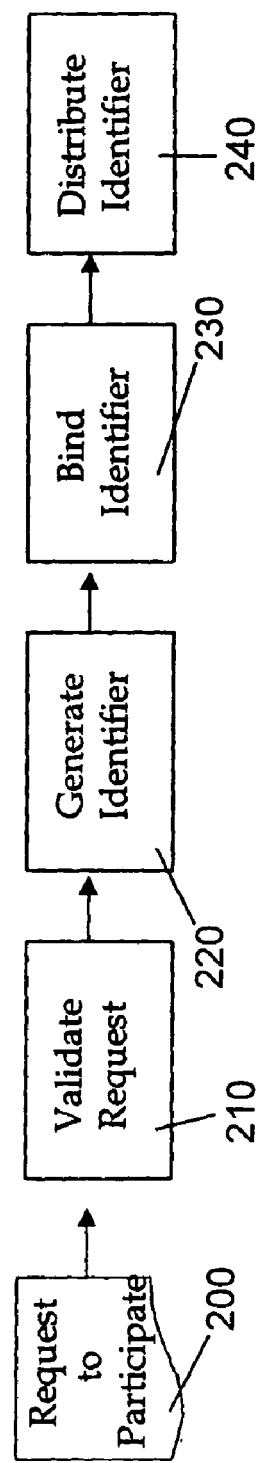
FIG. 2 is a block diagram of the registry process in accordance with a preferred embodiment.

Identifiers are issued to entities during part of a registration process that validates an entity's request to participate in a system, generates a unique identifier, binds that identifier to the requesting entity, and distributes the identifier to the now participant entity. FIG. 2 is a block diagram of the registry process in accordance with a preferred embodiment. The technology is invoked at several points to facilitate this process. Processing commences at 200 when a request to participate in a transaction is received. Then, the request is validated at function block 210, and an identifier is generated as shown in function block 220. Then, at function block 230 the identifier is bound and finally at function block 240, the identifier is distributed.

Similarly, once participating entities have been registered, an authentication mechanism validates the identifier during a transaction. Authentication is the process that validates that the entity requesting access, whether human or automated, is the true owner of that identity. Authentication is performed by three primary methods—by validating what the user/entity knows, what they have, or what the are. FIG. 3 illustrates examples of authentication methods in accordance with a preferred embodiment. Strong authentication refers to the use of two of these methods in combination. Establishing user identity in the publicly accessible internet is obviously more challenging than doing so in more isolated environments. The system, in accordance with a preferred embodiment, must be able to positively identify the parties involved in a system communication (at least so far as is necessary to meet reasonable business requirements). The system supports this requirement by utilizing digital certificates as defined in the ISO X509v3 standard. A set of process and services called a Public-Key Infrastructure (PKI) is used to create, maintain, and manage digital certificates. More detail on the structure and management of the system PKI is provided below.

Access Control

Once identity has been established, access control rules determine what resources the entity may use. In one frequently used model of secure computing, the entities of interest in a system are "subjects" and "objects." A subject is an active entity, loosely described as a program in execution, and the surrogate of a person. A subject has an identity and attributes. An object is a passive entity, usually a repository of information. The goal of the access control requirement is to reliably mediate the access of subjects to objects. On each attempted access of an object by a subject, the system determines whether or not the access is to be granted. It does this by applying a set of access control rules along with information it has about the subjects and the objects.

Access Control is used to permit or deny a specific type of use of system resources. For example, a user may be authorized to access a resource, but only for reading. Access control can be used to arbitrate access to files, processes, operating system ports, application functions, database tables, portions of a network. Of paramount concern to system user's is the protection of private, proprietary, business-related data. It must be protected while in transit to the system and while stored in system databases.

Audit

The purpose of auditing is to provide accountability; that is, ensure that users of the system are held accountable for their actions. Auditing is used to record accesses to resources, and may be implemented at a number of layers, including operating system, database, application, middleware, as well as in network devices such as firewalls and routers. Auditing is typically implemented in combination of these layers to allow reconstruction of events after a security problem is detected. Good logs should be searchable for known or suspected patterns of abuse, and should be protected from alteration. Logs can monitor a variety of data, including access times, user IDs, locations, actions the user performed, and whether or not those actions were successfully completed.

Well-designed log strategies allow the employment of forensic analytical tools for determining the source cause for poorly behaved systems. As such, auditing is a strong risk mitigation mechanism. In addition to the traditional audit requirements usually associated with secure systems, system has need for a particular sort of accountability. Clients must be assured that the documents that they transmit to a government agency have been received. In order to effectively replace paper-based systems, the system must be able to prove to its clients that government agencies have received the documents they sent.

Integrity

In the context of computer security, the term integrity has two different, but related meanings. First, integrity refers to the property that any system must have if it is to protect itself, and assure that it will enforce the security policy. Integrity is the characteristic of a system (or component) that the system's implementation conforms to its design. Of the five requirements, it is the most nebulous but perhaps the most important. Systems breached by buffer overflows, faulty parameters or attacks on improperly configured network ports have failed to meet the integrity requirement. Such faults appear at the boundaries to a system and must be removed by a thorough analysis of its interfaces. Viruses constitute another (and better known) attack on integrity, which can only be countered with user vigilance and anti-virus software. The second use of the word, sometimes referred to as file integrity, refers to a system's ability to ensure that a particular file, document, or message is unaltered after its creation or transmission.

Network Security

Like any other Web-based application, the system, in accordance with a preferred embodiment, presents an interface to its customers on the publicly accessible Internet. Unlike "virtual storefronts" that sell books and CD's, however, the system does not welcome anyone that happens to walk by to come in and browse. In order to enter the system, a client must present a credential that identifies him as a system client first. The public-key technology described below insures the integrity of each transaction, and is also used to authenticate the user to the system server and the system server to the user in accordance with a preferred embodiment. Each entity sends the other a short message that they sign with their private key. Each is then assured that they are "talking" to who they think they are. Although system security does not rely on "obscurity", every effort is made to diminish the visibility of the "members only" system site. For example, a non-standard port is used for HTTP, thereby hiding the site from casual browsers and from search engines and agents that generate random IP addresses to see if any servers respond.

Network Security Requirements

1. Only system subscribers should be able to establish a connection to system application servers. Web pages intended for the general public is hosted on a different machine.

2. Certificate-based authentication occur at the outer perimeter of the network.

3. Only those services that are required to perform system functions is enabled. (e.g. anonymous FTP is disabled)

4. All traffic to and from the system application servers is encrypted.

Firewalls

Figure 4:
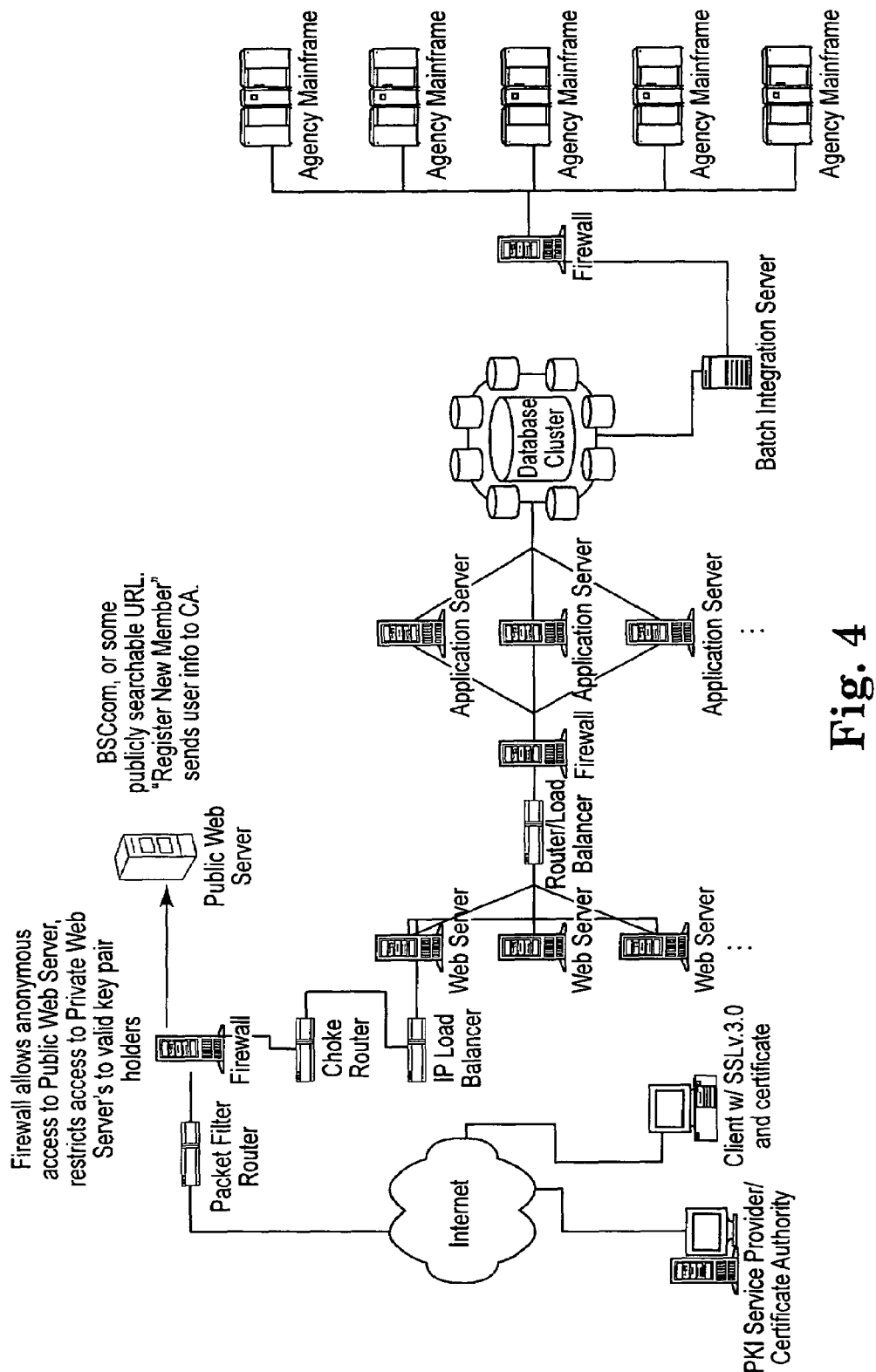
FIG. 4 illustrates the components of the system network architecture in accordance with a preferred embodiment.

FIG. 4 illustrates the components of the system network architecture in accordance with a preferred embodiment. The fundamental goal of the firewall is to partition the system network and control the traffic that passes between these segments. The partitions comprise:

The external Internet;

The Web Server's network; and,

The Database Server network.

Only HTTP traffic is allowed to enter the Web Server from the Internet and only SQL traffic is permitted between the web server and the Database.

Application Security

Application security addresses the need to prevent valid users from accessing certain system resources after they have been authenticated. Since the system is not a publicly available application where anonymous users are allowed to browse, clients access must be constrained to their own data. The security challenge in a multi-tiered, distributed system whose architecture is focused on speed and transaction throughput includes ensuring that no data access succeeds unless an authorization check ensures its validity. The components of the system architecture are integrated to keep track of users and resources and ensure that users only have access to their own data regardless of where that data resides.

Background

The following section recalls the fundamental security requirements describe above and discusses how they is enforced by the system application components.

Identification and Authentication

As described earlier, system relies on certificates to provide strong authentication from the client browser. Certificate data can be accessed from directly from IIS applications. The Active Server Pages Request object provides a collection called ClientCertificate, which is filled in when users are authenticated via certificate.

Access Control

The system application presents different web pages different users based on their state and line of business. Certain functions may be restricted to users that have paid an extra fee. Of course, each business is constrained to its own records. Access control lists associated with each controlled resource implement these controls. A user's permissions are compared with the name or identifier of the resource that the user is trying to access. If the user has the appropriate permission to access the resource, then the validation process succeeds. Otherwise, the validation process returns a failure response.

Audit

NT and SQL Server provide auditing capability that allows administrators to monitor access (and failed access attempts) to objects such as files and database records. An important part of the operational procedures for system is to establish a continuing program of audit log inspection. In addition, the application is able to generate audit records that capture higher-level activity (e.g., entire transactions). Third-party tools that facilitate the easy collation of audit records across system components may be employed Integrity The paramount integrity concern for a preferred embodiment is session management. Session management refers to the need to ensure that a client's session cannot be "taken over" by another user and that sessions don't persist after the initiating user has logged off. In a distributed system, NT processes and database connections are re-used to avoid the overhead associated with the creation and disposal of these data structures. Typically, the application stores the time of logon and a user name or ID number in memory or a database to provide a system administrator with a view of who is currently logged onto the system. Other session management tools include an end session command and an end all sessions command to be used in administering the application. Session information is typically tracked through the use of a token or cookie that is written to the user's hard drive after a successful logon.

Application Components

The software components comprising the system are:

IIS: Internet Information Server is the Microsoft Web server platform for Internet Applications.

Active Server Pages: ASP is a software mechanism that effectively replaces the scripting mechanisms used to develop some web applications. ASP directly manages operating system services like processes, substantially improving performances.

Microsoft Transaction Server: MTS is the service that provides database transaction support allowing developers to create a single database transaction from the multiple reads and updates that constitute it.

SQL Server: This is the relational database that serves as the repository for system data.

The system adheres to the following guiding principals regarding application security:

Exploit other system security mechanisms: Like the document and network security architectures that make use of digital certificates and a public key infrastructure, components of the application relies on these identifiers for access control.

Keep application security close to the server OS: The system in accordance with a preferred embodiment utilizes NT and infrastructure-based security mechanisms wherever feasible. Due to their increased vulnerability, custom implementations should only receive consideration as a secondary option.

Provide real time configurable settings: The security architecture should allow administrators to change common security settings such as password lengths, numeric character requirements, number of unsuccessful logons before an account is locked, and auditing message volume.

Application Security Process Overview

Application Security Components

Figure 5:
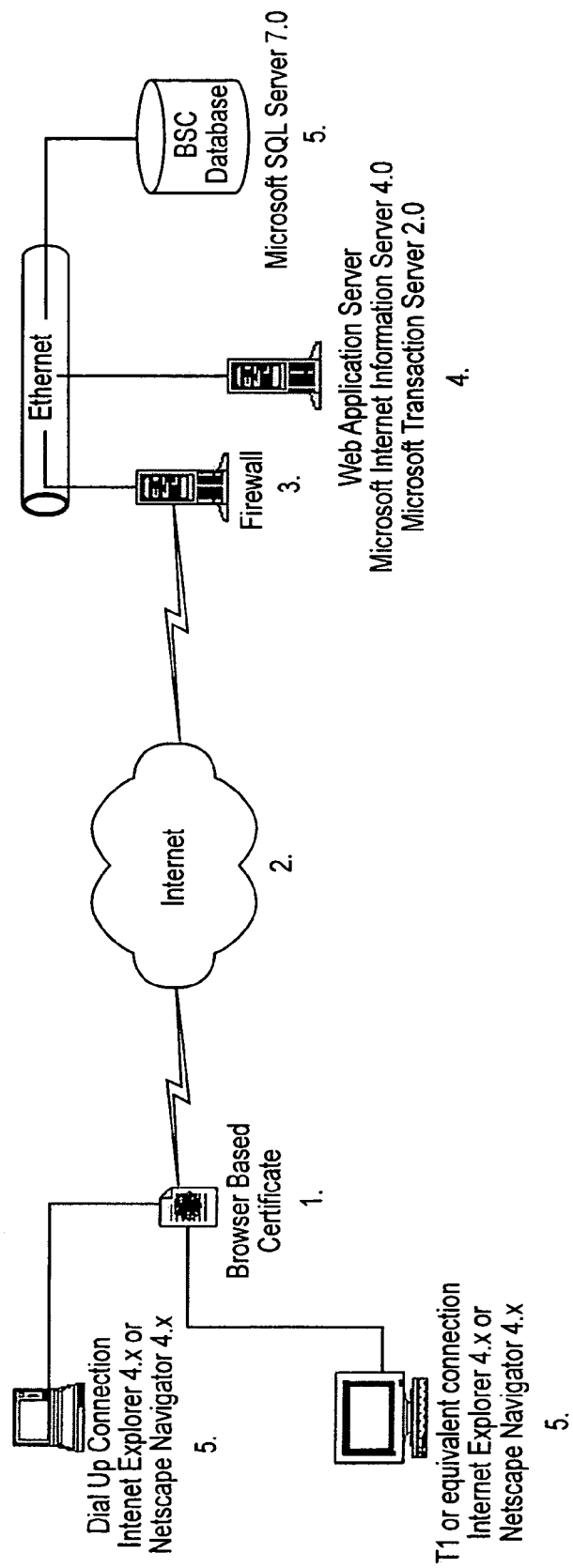
FIG. 5 illustrates an application security architecture in accordance with a preferred embodiment.

FIG. 5 illustrates an application security architecture in accordance with a preferred embodiment. Each client of the system is issued a digital certificate by a certifying authority. Because of the integration of IIS 4.0 with NT any active server page based web application built on this platform has the capability of reading the data off of any certificate installed into the client's software. Therefore, it is possible to identify the user by a unique D number that resides in their digital certificate.

1. Once the proper certificate is found, the active server page reads the user information out of the certificate and pulls it over the Internet.

2. The data packet passes through the firewall on the active HTTP port.

3. Upon receiving the user information, IIS 4.0 maps the user's public key to an NT account on the machine. MTS then checks if the NT account user is in the proper role whenever access to a component resource is requested.

4. After successful component security checks, MTS components perform required modifications to the database as requested. Second tier components then pass their data back to IIS. Finally, updated content is pushed back to the client.

The Client's Browser

Clients access the system application with a standard Internet browser. One of the pre-eminent design goals for the system has been to require no specialized or proprietary software on the user's desktop. However; certain requirements of the system mandate that users have the most up-to-date versions of the commercially available browsers. Specifically, system users must install either the 4.x versions of either Microsoft's Internet Explorer or Netscape's Navigator on their desktops. The security issues associated with the software on the clients machine are discussed in this section.

Private Key Security

When a government agency accepts a tax payment or other filing from a business in the current paper-based environment, there is no routine verification of the filer's signature. It would be cumbersome and is largely unnecessary. The likelihood of some intruder impersonating another for the purpose of filing their taxes seems small. So, the risk to government agencies as relying parties seems reasonably small. However, in contemplated future releases of the system, client certificates may be used to identify purchasers of goods or services among business. In such circumstances the incentive to impersonate another in an effort to obtain services fraudulently are handled by captured by security.

One of the central features of the system security approach is the use of public-key cryptography to insure both confidentiality and integrity of submitted documents. The user's private key, whose secrecy must be maintained, resides on the user's machine. Although it too, is protected by a password that encrypts it while it is stored on the user's hard drive, without due care it could be subject to compromise. system clients is led to understand the pivotal role that the security of this key plays in the protection of their assets. Other important security practices, such as not leaving an ongoing system session unattended is stressed in a program of security education directed toward system users.

Form Signing

To conduct business with government agencies, system user submits relevant information to system systems. To complete a system-enabled transaction, the user must examine the data to be transmitted to an agency. When a user is satisfied that the displayed data is correct, the data is digitally signed and transmitted to the government agency. Currently, there are two difficulties to be overcome. The first difficulty is technical. The capabilities of the recently released browsers do not permit the contents of forms to be signed. (The contents can be encrypted, but not signed.) Netscape Communicator version 4.04 and later will introduce the ability for JavaScript code to request that the user sign a block of text. The Signature Verification tool (currently available for evaluation purposes only) can be used on the server side to verify the integrity of a signed block of text, and to extract information from that block. However, Microsoft's intentions with respect to this deficiency are unknown. The second difficulty is legal. Although the integrity of digitally submitted documents can be guaranteed with the use of digital cryptography, one of the persistent legal requirements that digital technology does not change is the need for document signers to understand completely what they are signing, and for there to be no ambiguity concerning the signers intentions.

The system must create complete and accurate records of each transaction. Standard HTML cannot replace paper forms because they do not create accurate records. HTML forms store only the user data—they do not store the questions that the user answered when entering that data. For example, a user might answer "yes" to the question "Are you a citizen?" When this form is saved, however, only the "yes" answer is stored. The question itself is lost, and it is impossible to be sure what the original question was, unless it is somehow stored with the response.

The UWI Corporation has developed one possible remedy. UWI software can be used to create forms that are exact duplicates of the current paper-based forms that business currently submit to government agencies. The entire form is stored as a single object, so that when digital signatures are used to authorize an Internet Form, the entire form is signed, not just the data entered by the user. As a result, there is no ambiguity about the signer's intentions because the data remains in context in which it was originally signed. The UWI software required on the client's browser can be downloaded and installed as a plug-in. This is done as part of the initial establishment of user accounts and does not add appreciably to the complexity at the user end. Other third party vendors offer similar solutions.

Document Security

In order to manage the public key structures on which the system relies for it security, it is necessary to establish a broad set of roles and responsibilities to which the involved parties must subscribe if the benefits of digital certificates are to be fully realized. This set of roles, processes, software and services that enable the use of public key cryptography and certificates in a distributed computing system is called a Public Key Infrastructure (PKI). Comparatively few PKI have been built and many of those have been designed to accommodate a "closed community" or some group of individuals focused on a particular mission for whom Certificates satisfy a specific need. Such groups have diminished concern for issues such as interoperability and enjoy the luxury of being able to deploy specific software to each client to satisfy particular necessities. One of the dominating design goals of the system architecture has been the requirement to minimize specialized software on the client's desktop. Ideally, the computer user who has standard browser software should be well positioned to become a system client. In many cases, closed PKI deployments rely on in house software to create key pairs and distribute them to end-users. An alternative model, to be employed by the system, outsources the creation and distribution of key pairs. The system secures the services of a "Certificate Manufacturer", such as VeriSign or GTE CyberTrust.

Their function in the system PKI is described below. There are a number of interlocking functions and mutual obligations to be fulfilled by PKI participants. In the sections that follow, we will characterize these interrelationships and propose a model for their management in the context of system requirements. Definitions of some of the fundamental roles are provided, and an expanded discussion of each of these roles follows.

Issuer: At a minimum, the issuer is the party whose name appears on the field "Issuer", which is part of every certificate. In this model, the issuer is the system and is distinct from the Certificate Manufacturer.

Certificate Manufacturer: In the context of the system, the Certificate Manufacturer is the company with whom the system contracts to generate key pairs and distribute them to system clients.

Relying Part: A relying party is an entity that depends on the accuracy and validity of the certificate.

Subscriber: A subscriber is a party to whom a certificate has been issued. Business owner clients of the system is subscribers. Ideally government agencies to which filings and payments are sent is also.

Repository: A Repository is an online source of up-to-date information about certificates, their current reliability, related network infrastructure, legal obligations, and other information helpful for secure electronic commerce.

Figure 6:
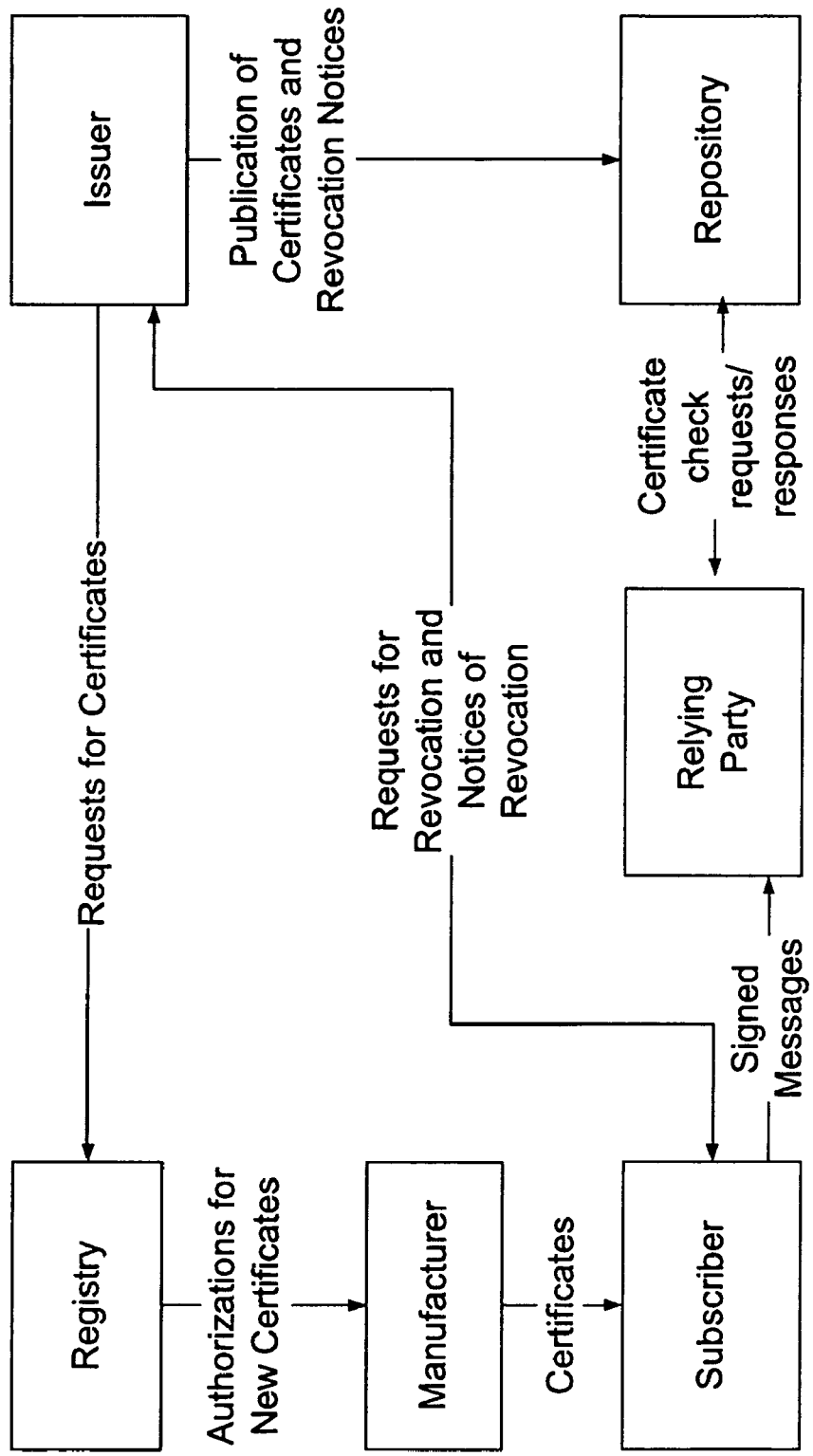
FIG. 6 is a block diagram of the major information flows that are described in the following sections in accordance with a preferred embodiment.

FIG. 6 is a block diagram of the major information flows that are described in the following sections in accordance with a preferred embodiment.

The Certificate Manufacturer

The Certificate Manufacturer provides operational services for the system (The Issuer).

Generate the system Key Pair: The CM creates a key pair for the system. The private key of that pair is used to sign the certificates of system subscribers. One of the primary services provided by the CM to the system is the continuing protection of this private key. Since the validity of the subscriber's transactions ultimately depends on that security, this is an important function. The CM holds this private key as trustee or custodial agent of the Issuer. The contract between the CM and the system must specify this relationship.

Figure 7:
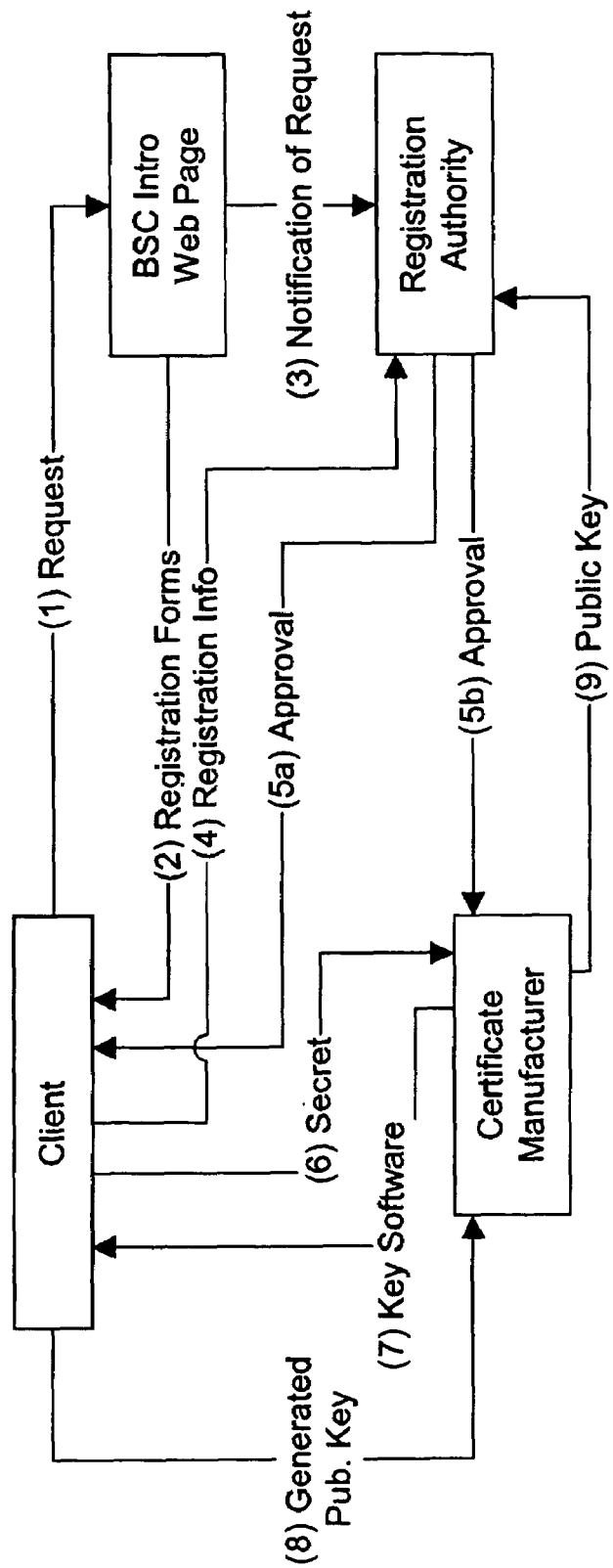
FIG. 7 is a block diagram of certificate processing for a new client registration in accordance with a preferred embodiment.

Generate, sign, and publish certificates on request: The system issues a request, authorizing a new client to receive a certificate. On receipt of a request from the system, the CM creates a certificate containing the information supplied in the request. The CM then digitally signs the certificate using the private key created above which is certified as representing the system. The CM uses a trustworthy system in performing these functions Give notice of revocation: On receipt of a request, the Certificate Manufacturer also creates notice of revocation in a prescribed form, signs the notice using the private key certified as the Issuer's, and publishes that notice into a Repository. The CM issues digital certificates that allow the use of a system service to new clients as part of a registration process. This process validates a new client's request to participate in a system, generates a unique identifier, binds that identifier to the client, and distributes the identifier to the now participant client. FIG. 7 is a block diagram of certificate processing for a new client registration in accordance with a preferred embodiment. In FIG. 7, the Issuer is represented in the sub-role of Registration Authority.

Sequential processing proceeds as described below:

1. Client requests application forms from introductory web page, supplying e-mail address.

2. Forms sent to user a e-mail address.

3. Registration Authority notified to expect forms from client

4. User fills out form and returns to Registration Authority.

5. Registration Authority approves application, and e-mails approval notification and shared secret to CM and client.

6. Client mails secret to CM.

7. CM mails key generating software to client.

8. Client sends generated public key to CM.

9. CM sends public key to Registration Authority.

The major purveyors of certificate services (e.g., Verisign, GTE CyberTrust) offer a "branded" service that follows the model described above. New subscribers communicate with a web page which, though hosted by the CM, provides content that is targeted solely to new system clients and may not even mention the CM by name.

As digital certificate legislation advances in the various states where the system intends to deploy, there may be some constraint placed on the choice of Certificate Manufacturer. Certain states have dictated that only certified vendors of such services is allowed to generate key pairs that the state considers to be evidentiary and legally binding.

Certificates contain numerous optional fields whose contents are determined by the Issuer. The CM puts in the certificates whatever the Issuer instructs. A CM typically has no obligation to confirm the accuracy of the content of the certificate or to provide customer service or revocation support directly to a Subscriber. A CM is also generally not listed anywhere in the certificate. Subscribers and Relying Parties may not and need not know that CM was used in producing the certificate, and the certificate generally does not indicate as much on its face.

Issuer

The Issuer is listed in the certificate signed by them, and is the principal contracting party with Subscribers and Relying Parties. Therefore, the Issuer's rights and duties to Subscribers and Relying Parties are primary and direct. The Issuer has a right of recourse against the CM for defects in generation, unauthorized signing, faulty publication, and other shortcomings in the performance of the CM's obligations. Among the functions performed by the system in its role as issuer are the following:

Issue certificates: The listing of the Issuer's name in the Issuer field of the certificate is the defining act of the Issuer. All other obligations could conceivably be reassigned, outsourced, or delegated, but if the system is not named as Issuer in the certificates it ceases to fit the definition of "Issuer." The system's most fundamental commitment to its subscribers (in its role as issuer) is to confirm the validity of subscriber application and authorize the CM to generate a key pair for the Subscriber. As long as the subscriber's account remains in good standing, a subscriber may obtain certificates for its account by request, in accordance with applicable rules (Ordinarily, new certificates are issued annually.. The issuer notifies the CM who generates certificates listing the system as the issuer, signs those certificates with the system private key, and returns them to the subscriber for acceptance.

State certified information accurately: The system is obligated to represent information in the certificate accurately in so far as it is able to do so. A client is better able to vouch for such accuracy and should do so before acceptance.

Notify the subscriber of issuance: After issuing a certificate, the system informs the Subscriber of the issuance and provides a means for the Subscriber to review and accept the certificate before it is published or released to prospective Relying Parties.

Invalidate a certificate on request: The system is obligated to revoke or otherwise invalidate a certificate and give notice of the invalidation on receipt of a verifiably authentic request from the Subscriber of the certificate. Contracts may also provide for other notices regarding certificate reliability. Since the revocation of a certificate is final, the only way to reinstate a subscriber after their certificate has been revoked is to issue a new one. The system may establish some mechanism whereby a certificate is temporarily invalidated without actual revocation, but this may prove too problematic. However, the system must reserve the right to revoke certificates for valid reasons, such as a client's non-payment or other violations of contract. Both subscribers and relying parties must receive prompt notification of revocation.

Publish certificates: The system publishes certificates and notices of revocation in a repository. Over time, subscribers will have multiple certificates that validate their signatures, so the system maintains a history of previous certificates as long as the subscriber remains a system client.

Relying Party

A relying party is an entity who depends on the accuracy and validity of the certificate. In the system, the most prominent relying party is the government agency that relies on the signature to be a legally binding affirmation of the signatory's intentions and truthfulness. Depending on the design of the system interface with individual states, system clients may also be relying parties. For example, if a government agency becomes a subscriber and digitally signs receipts for filings received from system clients, then the client is also a relying party. In later releases of the system that include functionality to expedite transactions between clients, those clients will also be a relying party. Whether system client or government agency, all relying parties should agree to be bound by the following obligations: Rely within limits: Certificates expire routinely and may be revoked if the confidentiality of the private key is compromised. Relying parties should therefore make reasonable effort to ascertain the validity of the certificates on which they rely. The repository, discussed elsewhere, exists to disseminate such information. The Relying Party must rely reasonably and justifiably. Subscribers may require assurance that they are held harmless if a state agency relies on a revoked or expired certificate negligently.

- Use system Certificates for system Transactions Only: For each state in which it operates, the system serves as intermediary for a number of specific transactions. However, system functionality is used to digitally sign any document. The system stipulates that agencies should use the system certificate to validate approved transactions only.
- Provide notice of invalid certificates: Recipients of digitally signed documents will routinely (and, in most cases, transparently) check the validity of signed documents. Relying parties should be expected to notify the repository of documents that don't validate.

Subscriber

Subscribers as having the following functions and obligations:

- Private key safekeeping: The likelihood of forged digital signatures (signatures that falsely appear to be attributable to the Subscriber) is quite negligible if the Subscriber does not lose exclusive control over the private key used to create the digital signatures. The Subscriber uses the private key, and the only entity that can keep it safe. Clients have the same incentive to protect their private key as they currently have to protect access to their tax and employee records and can be assumed to comply with system suggestions for its protection. If information contained in the certificate is inaccurate or becomes obsolete and relying parties could be misled, the subscriber should correct them. The precise contents of the system-issued certificates have yet to be determined, but one goal of the design is to minimize superfluous material from the certificates, (e.g., phone numbers) since certificates cannot be changed, but must be revoked and reissued.

Provide timely notice of compromise: If a subscriber loses control of their private key or has any reason to suspect that their security may be compromised the client should alert the repository as soon as possible.

Initiate certificate invalidation when appropriate: Often, only the Subscriber can know when an event warrants revocation of a certificate, such as when facts stated in the certificate become inaccurate with the passage of time. The Subscriber is obligated to the Relying Party to have the Issuer invalidate the certificate when the need arises.

Use within contractual limits: The subscriber must agree not to use their system issued certificate to validate messages or transactions not submitted through the system interface.

Repository

A repository is an online source of current information about certificates, their current reliability, related network infrastructure, legal obligations and other information useful to PKI participants. The repository's primary customers are the relying parties. The repository is managed by the system and will function in close contact with the operations management team. A repository is obligated to provide the relying parties with accurate and timely information about the status of certificates.

Registry

The Registry is responsible for confirming the identity of new subscribers and authorizing their admittance as new subscribers. In a closed community of participants such as the employees of a single company, the registry function is usually straightforward, since there is little ambiguity about the actual identity of an employee. However, the system must cope with competing goals with respect to registration. On one hand, the system wants to enroll as many subscribers as possible. But if those subscribers are not properly identified when their certificate is issued, the benefits of digital certificates may be nullified. Digital certificates can only provide non-repudiation if the holders of those certificates have been positively identified when the certificate is assigned. But a process that requires the services of a notary-like identification check may be considered too cumbersome, especially if the success of the system depends on the rapidity with which new subscribers are enrolled.

However new user registration is accomplished, the registry will take requests for new certificates from the Issuer, perform whatever validation on the proffered data is considered adequate and inform the issuer How Digital Signature Technology Works Digital signatures are created and verified by cryptography, the branch of applied mathematics that concerns itself with transforming messages into seemingly unintelligible forms and back again. Digital signatures use what is known as public key cryptography, which employs an algorithm using two different but mathematically related keys: a private key and a public key. The private key is used to perform two functions:

To create a digital signature or

To transform encrypted data into its original form.

Conversely, the public key is used to:

Verify a digital signature

Encrypt data

Because different keys are used for encryption and decryption, software utilizing two such keys is often collectively termed an asymmetric cryptosystem. As the names imply, the private key used for signing and decrypting is known only to the signer or decryptor, while the public key used for signature verification or encryption is available to all. If many people need to verify a signer's digital signatures, the public key must be available or distributed to all of them, perhaps by publication in an on-line repository or directory where it is easily accessible.

Although the keys of the pair are mathematically related it is computationally infeasible to derive the private key from knowledge of the public key. Thus, although many people may know the public key of a given signer and use it to verify that signer's signatures, they cannot discover that signer's private key and use it to forge digital signatures. Another fundamental process, termed a hash function, is used in both creating and verifying a digital signature. A hash function is an algorithm that creates a digital representation or fingerprint of a document in the form of a hash value. A hash value is simply a large integer that has these three properties.

It is astronomically unlikely that two different documents will yield the same hash value It is impossible to reconstruct the original document from the hash value A minute change in the original document will have a large and unpredictable on the resulting hash value.

Hash functions therefore enable the software for creating digital signatures to operate on smaller and predictable amounts of data, while still supplying a correlation to the original document, thereby efficiently providing assurance that the document has not been modified since it was digitally signed.

Using digital signatures involves two processes, one performed by the signer and the other by the receiver of the signed document:

Digital signature creation uses a hash result that is derived from both the signed message and the signer's private key. There is only a negligible possibility that the same digital signature could be created by the combination of any other message or private key.

Digital signature verification is the process of checking the digital signature by reference to the original message and a given public key, thereby determining whether the digital signature was created for that same message using the private key that corresponds to the referenced public key.

Business Capability in Accordance with a Preferred Embodiment

Figure 8:
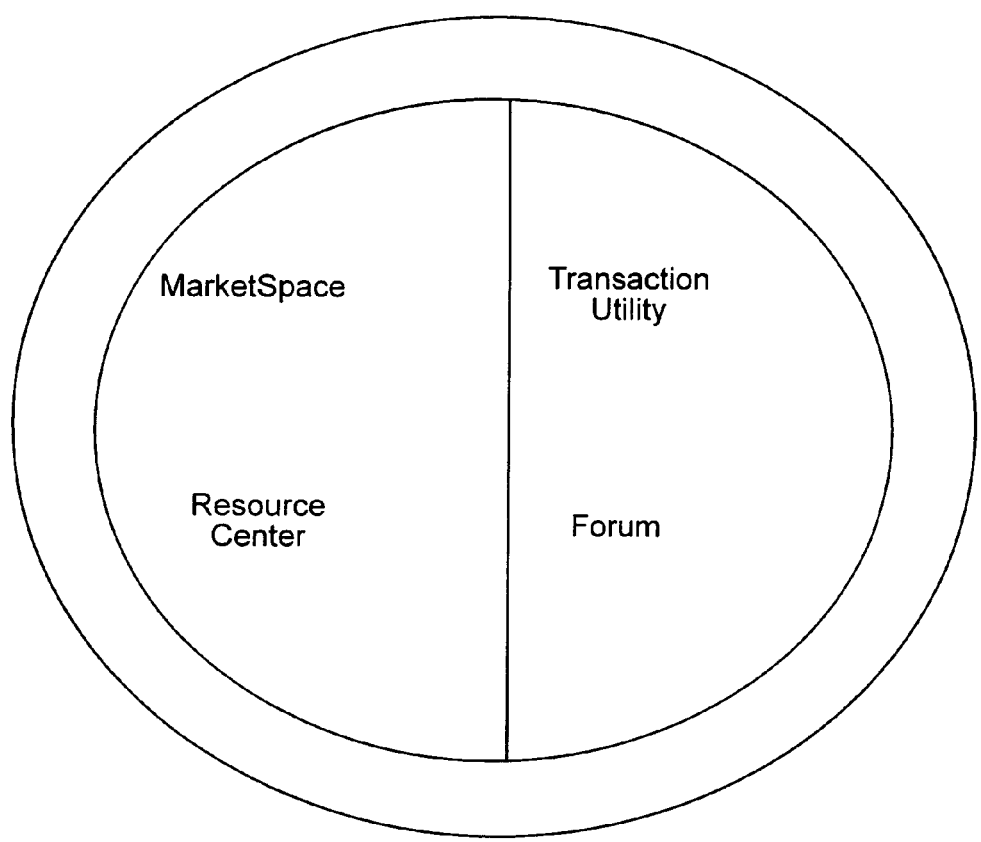
FIG. 8 illustrates a member feed in accordance with a preferred embodiment.

The purpose of this section is to identify the business capability definitions for the Business Service Center (system) in accordance with a preferred embodiment. The five capabilities provided by the system are the Business to Government Transaction Utility, the Business Forum, the MarketSpace, the Business Resource Center and Member Feedback It is assumed that these capabilities will be provided through a Web-based application. FIG. 8 illustrates a member feed in accordance with a preferred embodiment.

Business to Government Transaction Utility

The business to government transaction utility provides businesses with the ability to electronically submit their government filings. Additionally, the status of transactions will be tracked within the system. The following transactions are provided by the transaction utility:

UI Tax/Wage Reporting—making periodic unemployment insurance (UI) tax payments and reporting employee wages to the agency responsible for administering unemployment insurance.

UI Claims Notification & Response—receiving notification of unemployment insurance claims and filing protests.

Sales Tax—filing weekly, monthly, or quarterly sales tax returns and making the required payments.

Withholding Tax—filing periodic federal and state withholding tax returns and making the required payments.

New Hire Reporting—completing the required new hire filings.

Business Registration—filing the one-time registration form with the appropriate agencies as well as making periodic updates and renewals, as needed.

Permits/Licenses—applying for and renewing high volume permits and licenses.

WC Filings—making required filings with the agencies responsible for administering workers compensation.

Job Matching—posting job openings and searching for qualified job candidates.

Training—searching for training programs.

Public Health Filings—making required filings for health care providers.

EPA/OSHA—completing the required filings.

Interaction with Other Capabilities

The transaction utility capability interacts with the Business Resource Center capability. If a member is attempting to perform a system transaction and the member requires functional assistance then the information that describes that function is displayed. This processing aids the member in resolving their problem as well as demonstrating the effectiveness of the information resource capability.

Key Business Architecture Elements

Delivery Vehicle—the transaction utility is the only capability that interacts with the back end portion of the delivery vehicle. The other three capabilities function solely with the front-end delivery vehicle.

Competency

The data that is sent to the government agencies is also sent to a mainframe. This is the only capability that requires deep skills in a mainframe/batch environment.

Functional skills are required to maintain current functionality for changing state and local regulations.

Constraints to Implementation

Willingness and ability for key government agencies to interact with the system.

Ability to process peak volumes (e.g., end of quarter filings).

Ability to enable contingency plan for processing transactions.

Ability to confidently provide for secure transactions.

Business Forum

This capability provides the members of the system with the tools to communicate with other entities. These could be other members of the system, external entities that provide a service, or simply other entities connected to the Internet. These services include the following:

Email—providing members with a mailbox to send and receive e-mail.

Discussion Groups—maintaining forums for members to discuss topics and issues related to businesses. This would resemble a newsgroup, consisting of a moderated thread of discussion.

Directory—maintaining a directory of system members.

Ask the Expert—provides members with the ability to ask business specific experts pertinent questions.

Interaction with Other Capabilities

The Business Forum capability interacts with the MarketSpace capability. For example, once a potential contact is identified from the Directory, a member could elect to go over to the MarketSpace to transact business with that contact.

MarketSpace

This capability provides the members of the system with the ability to interact and transact business with other non-government entities. MarketSpace features include the following:

Classifieds—providing on-line listings for members to post or view information, such as business opportunities or items for sale.

Alliance Specific Transactions—provides members with the ability to transact business with system alliance members.

Advertising—either through direct advertisements/sponsorships on web pages, or through prioritization in listings, provide members the opportunity to promote their business to other members.

Interaction with Other Capabilities

The MarketSpace capability may be linked to from the Business Forum.

Business Resource Center

The Business Resource Center provides members with information that is important to business owners, information that is specific to the partners of the system, and links to external entities and partners. Members are able to customize the content they elect to receive. Information includes the following:

General Business Information—Information regarding businesses is collected and displayed for the members. This will include national, state, and local business information as well as trade specific information. This could be information regarding new business legislation, local interest rates, news, stock quotes, etc.

Alliance Member Content—Information is provided by alliance members (i.e., Chamber of Commerce, NFIB) to the system. The content is created by the alliance and be posted on the system. Some of the content is downloadable to members on a fee basis. There is a need for content management for any information provided by the alliance members for version control, providing the most up-to-date information, etc.

Links to External Content—provides a link to an alliance partner's web site or other web sites that business owners might find beneficial.

FAQs—provides an answer to a frequently asked questions about the system site, specific trades, and business in general.

Interaction with Other Capabilities

The information resource capability interacts with the transaction utility. If a member is researching information that corresponds to a system provided transaction then the system will have the capability to transfer the user to the appropriate page within the transaction utility so that the member may perform that transaction.

Constraints to Implementation

Ability to maintain useful and up-to-date information.

Member Feedback

This capability allows the Business Service Center to solicit and report on feedback from members as well as directly contact targeted members. The feedback is used internally for defining potential improvements to system service offerings and externally by alliance partners for tuning their offerings. Information includes the following:

Alliance Specific Marketing Activities—provides system alliance members and external agencies the ability to send surveys, etc. to system members and members of their respective organizations.

Comments/Suggestions—allowing members the opportunity to provide feedback regarding the system in the form of comments and suggestions.

Interaction with Other Capabilities

This capability may be linked to from other capabilities to gain feedback on specific areas, but in general operates autonomously from other capabilities.

Payment Processing

The system payment process is divided into two parts: system member subscription payment processing and agency filing and/or reporting payment processing.

System Subscription Payment Processing

Members can subscribe to the system on a monthly basis for services at a fixed rate for a basic membership. Premium membership cost is to be determined. Payment for the monthly subscription can be made by Electronic Funds Transfer (EFT) or by credit card (American Express, Discover, MasterCard or Visa). It is assumed that the majority of subscription payments are made by credit card. Payment information is entered and saved within the system and billing functionality is initiated within the system. Payment processing is outsourced to an Internet electronic commerce payment provider such as CyberCash, VeriCard or iTransact.

The payment provider is responsible for receiving payment information from the system, processing the payment information, sending the payment request to the relevant financial institutions and receiving approval/denial, depositing funds to the system bank/financial institution, if approved, and sending a payment confirmation/denial message to the system. The payment provider is also responsible for processing credits or refunds.

System Filing/Reporting Payment Processing to Agency

The payment process can be initiated two ways—either as part of completing an agency filing or independent of an agency filing. Typically, a payment is made as part of an agency filing and/or reporting process. The agency filings that includes payments are new business registrations, quarterly unemployment insurance reporting, withholding and sales tax reporting for the system initial releases. There is little variance in the payment process across these different functions. For example, the process of making a sales tax payment is the same as paying a business registration fee.

Payments can be made via Electronic Funds Transfer (EFT) or credit card if applicable by the state agency. It is assumed that most payments for filing and reporting is made by EFT. Again, the payment processing is outsourced to a relevant Internet electronic commerce payment provider. If a state agency does not want to be involved with direct payment from the system, then an appropriate arrangement is setup with the agency to determine the best possible method for the system to provide payment information (i.e., account number(s), credit card number, etc.) to the agency.

The majority of the steps in the payment process are the responsibility of the payment processing provider. The system packages payment information and send it to the provider. The provider maintains and manages the steps involving the agency and system member financial institutions and the Automated Clearing House (ACH). The provider also is responsible for the processing of credits and/or refunds to bank or credit card accounts. The 'Additional Information' section at the end of this document contains specific assumptions on which this process is based.

Filing and Reporting

The Filing and Reporting process of the system is the mechanism by which a business submits transactions to state agencies. The business person is able to create, update, submit new filings or view previous filings. The Filing and Reporting sections of the Web site is available 24 hours a day allowing a business person to enter, update or review their form data. The information entered on the Web site is stored in the system database and on a nightly batch basis is submitted to the appropriate state agency.

The Filing and Reporting process also allows for the initiation of tax and other payments on-line by calling the Payment Process Function. When a business person selects the Filing and Reporting option from the Main system page, the Web site first determines whether the person logged into the Web site is involved with multiple businesses (in the case of an agent or a multiple business owner). In this case, the site supplies a list of business and prompts the user for a selection. Likewise, a business may be required to file in multiple states. A similar selection and prompting process allows the user to select the appropriate state for the business selected.

Once the state and business have been established, the user chooses a form to file. A complete list of forms is presented to the subscriber regardless of previous filing history.

Access to both forms and payment can be restricted on several levels. A subscriber may be able to view a form, make updates to a form, submit the form to an agency or submit payment to the agency. This access may be granted on a form by form basis, and be customized for different members of a business. This is particularly important for agents, who can complete a form, but cannot submit it on behalf of the business. For users who can update the form but not submit it to an agency, the information is saved to the system database. Upon saving or saving and submitting the information, form specific validation occurs. The program checks to see if any data is missing, incomplete or invalid The user will immediately be notified of any problems. The information included on the forms can originate from three different sources: a previous filing, an external source or by direct entry on the Web site. Prior to sending information to an agency, a confirmation of the data must occur. All the information that has been entered is redisplayed and the user is prompted to confirm that the information is correct. This is the point where the authorized person will "sign" the form using a digital signature. For submissions that require payment, the user has several payment options. The Web site will allow the ability to pay by way of Electronic Funds Transfer or credit card either in full or in part, and/or to defer payment all together. The ability to pay by credit card will be dependent upon the state or federal government acceptance policies. The Filing and Reporting section will calculate the required payment, and then initiate the payment process. This process will return the status of the payment, which will be saved to the database in conjunction with the original forms transaction.

All form information is transferred to the state agencies on a nightly basis. A batch extract function will retrieve those forms and reporting transactions that have been submitted since the previous batch run and create a transfer file. A state/agency specific batch program will create a file for each agency and actually transfer the information. A separate interface will receive a return status file from the agencies. This file will contain the status of each transaction, and a second batch program will be used to updated the system database with the status and create the appropriate client notifications. The user is notified of the status of their filing by using the notification sections of the system. In the case of a failure in the processing due to user error, an e-mail notification will be sent to the worker alerting them to the problem.

System Billing

The Billing process for the system is a monthly cycle that will calculate a subscriber's bill, electronically process payment, and notify the subscriber of the transaction. A third party billing software will be used to facilitate this process. All system payment will be received electronically by way of credit card or electronic funds transfer.

The subscription based model has two billing components. First, subscribers are charged a flat fee on a monthly basis which allows access to the system web site and the capability to file most agency forms. Certain types of filing will be offered as a premium service, and will be charged on a per transaction basis. Both of these components will be tracked in the system database and presented together in a monthly bill.

The system will produce a single monthly basis for both subscription fees and premium transactions. The billing process will be driven from an extract of the from the database. The extract file will include current monthly transactions along with all outstanding fees. Once the amount has been generated, it will be submitted to the general system payment process along with credit card or EFT information. The payment process will return an initial status of the payment. If the payment was successful, the account will be credited with the payment amount, and the next month's subscription transaction will be created.

In the event the payment transaction was not successful, the system will determine the previous delinquency of the account. If the account is in good standing, the user is provided with a grace period in order to remit the payment. Otherwise, the account will be deactivated until a payment has been received. In all cases, the user will be presented with an e-mail outlining a detailed history of transactions, the status of the payment transaction, and in the case of failure of the payment, the actions which have been taken.

In the case of a credit card payment, the status of the payment will be received immediately, but for EFTs, the initiation of the payment and receipt of money are one in the same. The lag between the two allows a potential overdraft situation. In the case of an overdraft, the system will determine the delinquent account, back out the overdraft payment and charge any penalties. The subscriber will be notified of the problem via e-mail and will be given the appropriate grace period prior to the account being de-activated.

Figure 9:
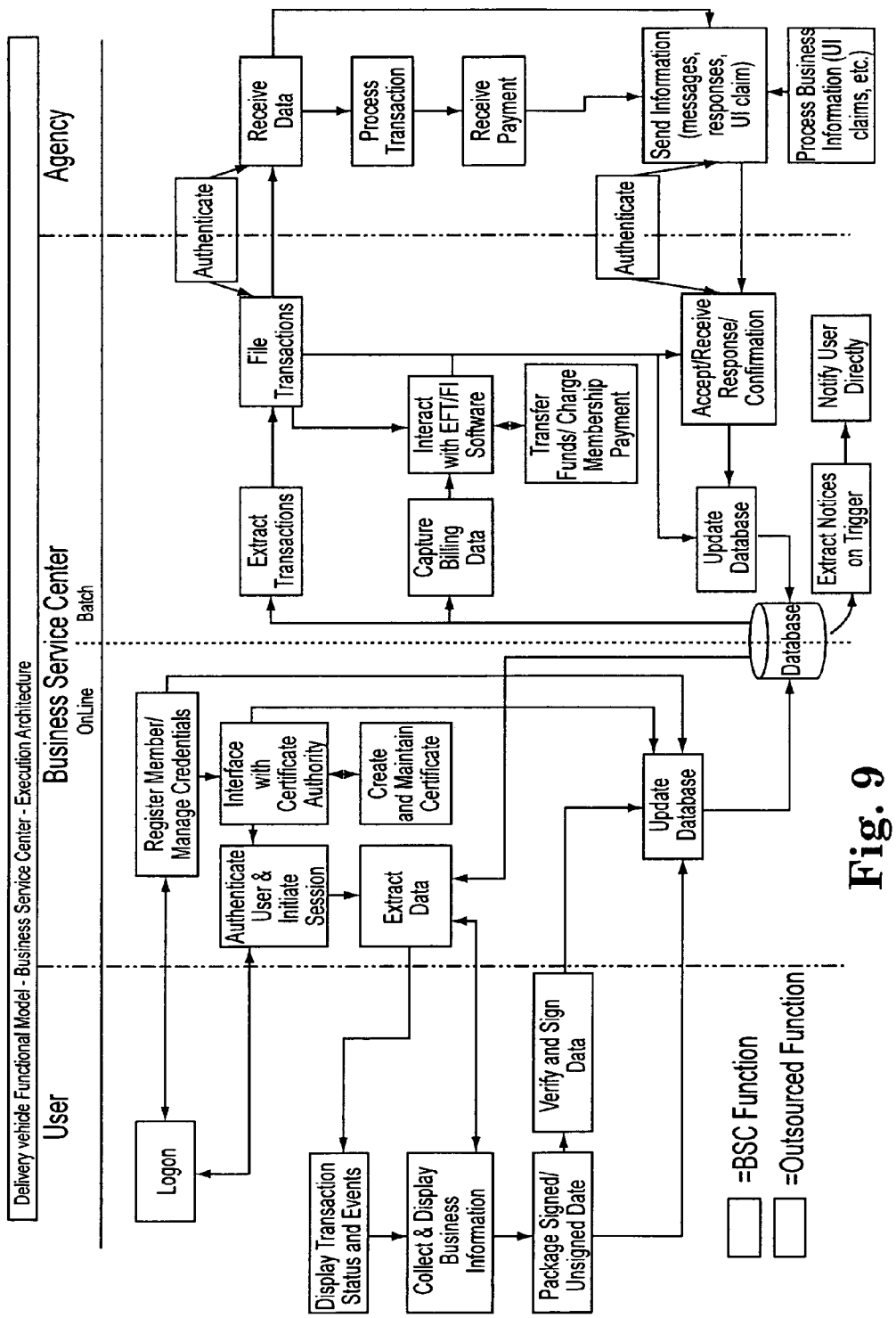
FIG. 9 is a functional block system architecture diagram flowchart in accordance with a preferred embodiment.
Figure 10A:
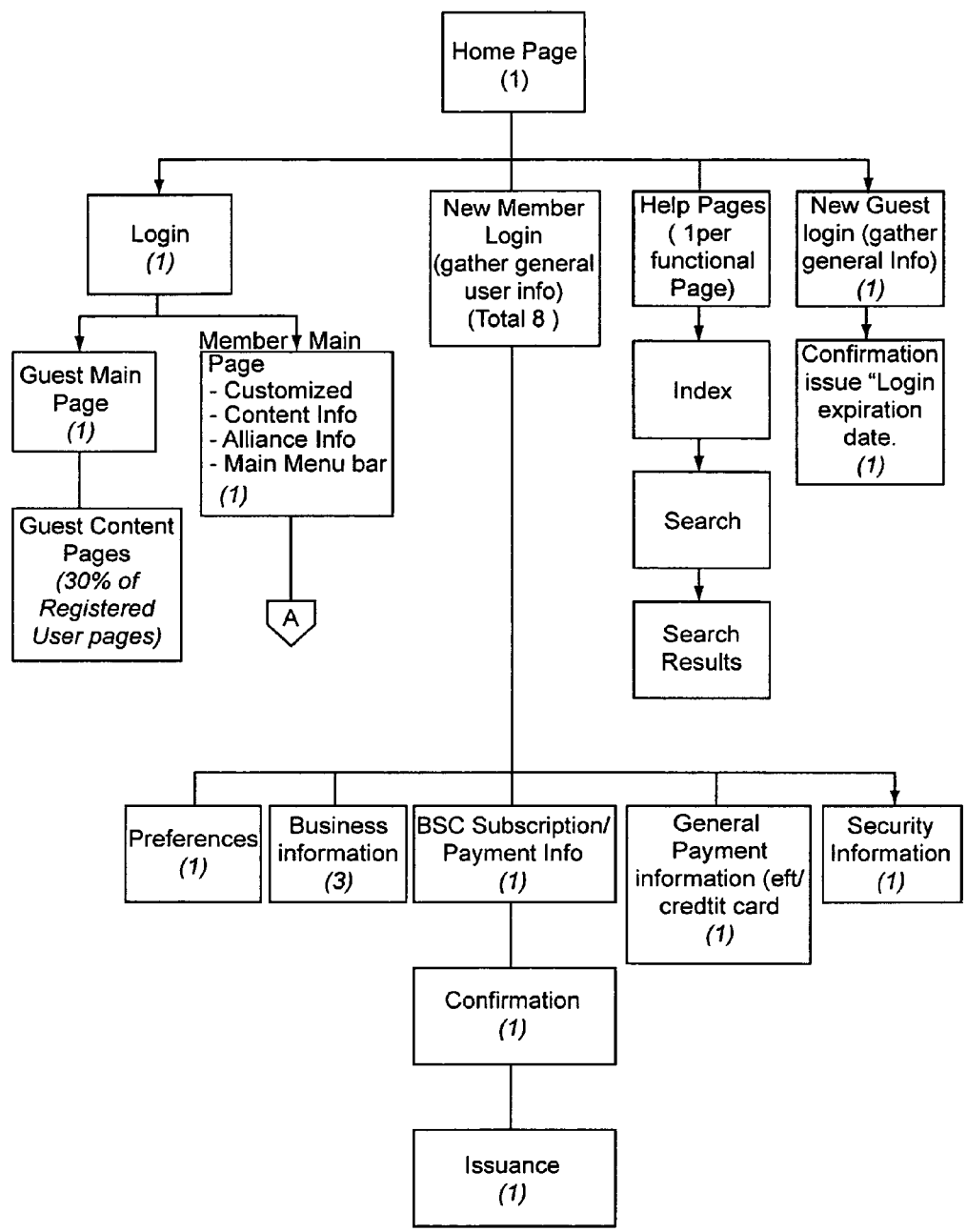
FIGS. 10A–10G are flow charts of the detailed processing associated with the login and overall system operation in accordance with a preferred embodiment.
Figure 10B:
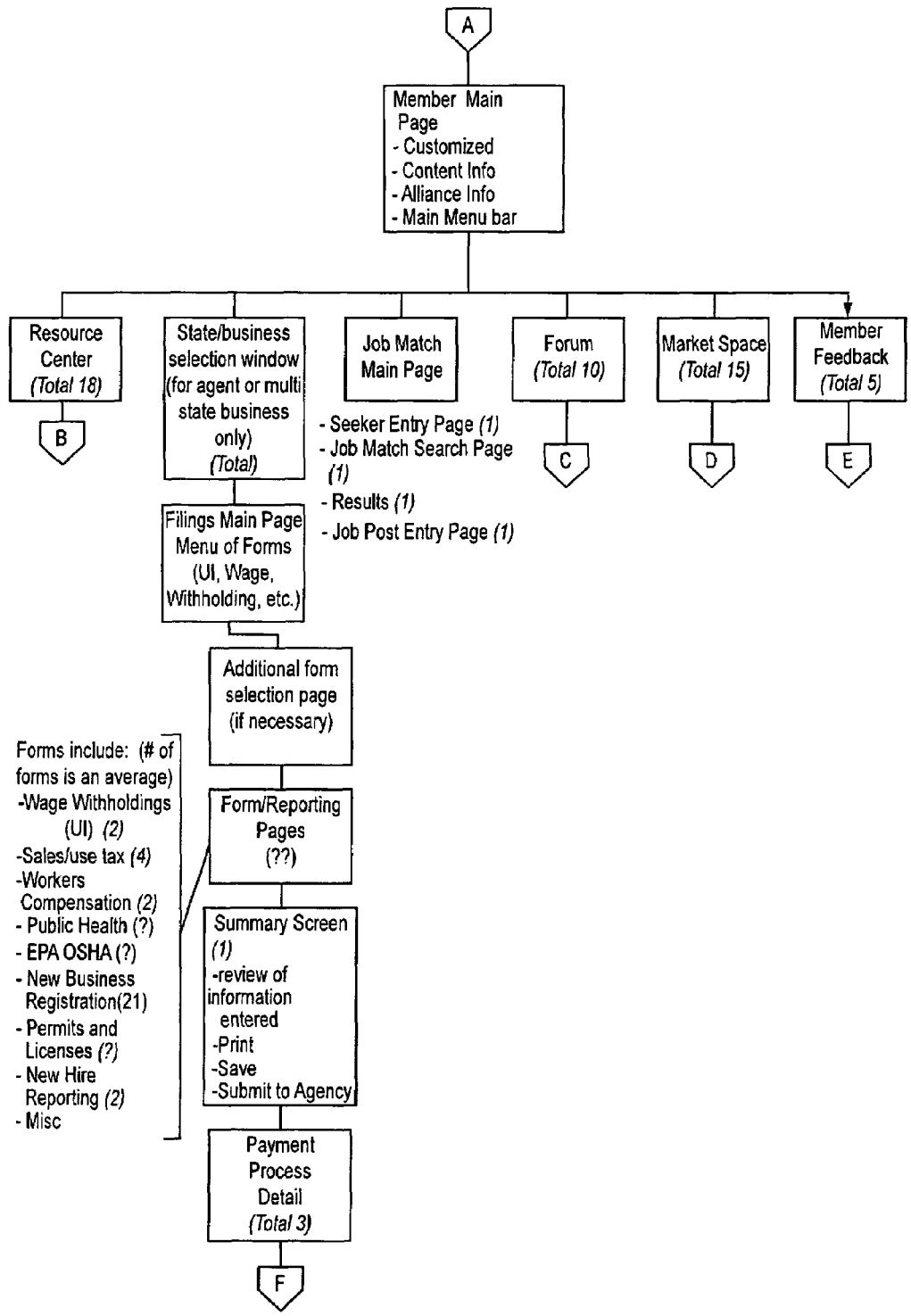
Figure 10C:
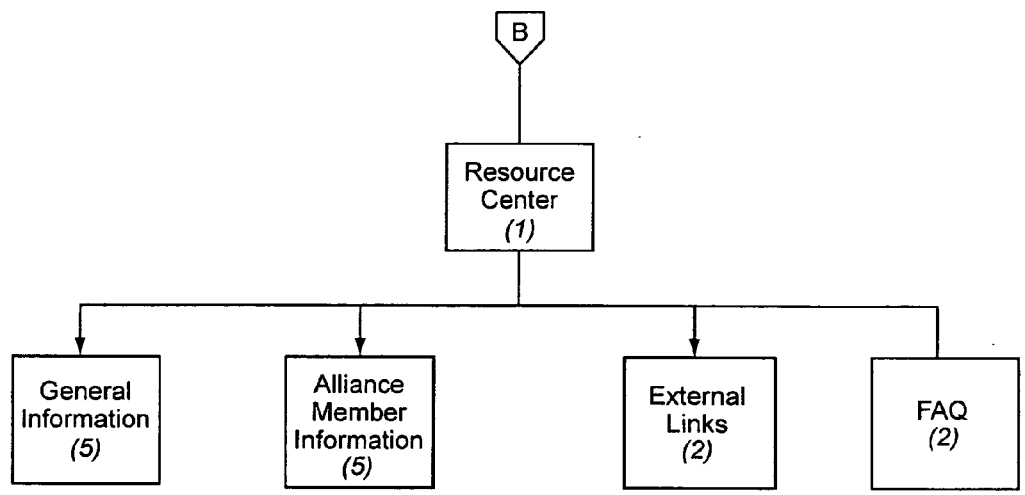
Figure 10D:
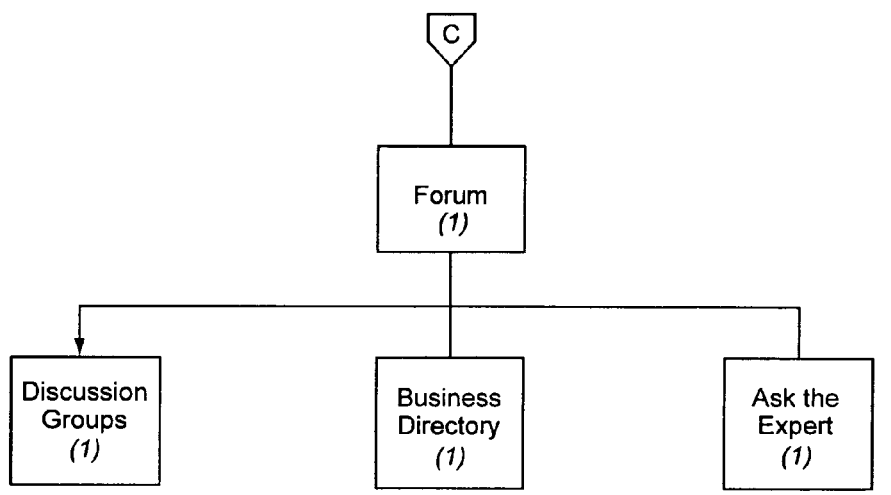
Figure 10E:
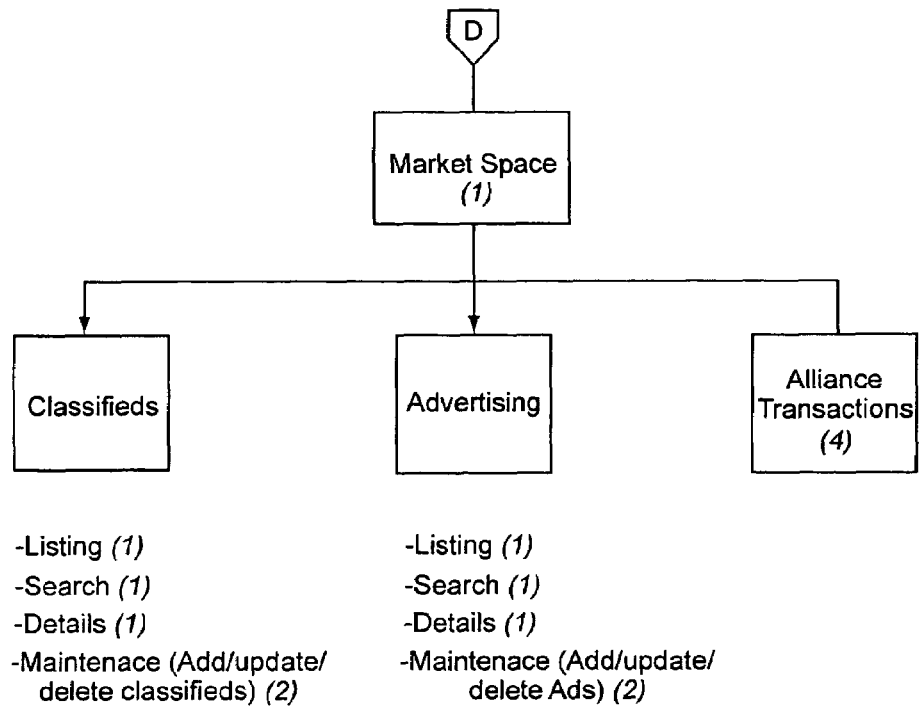
Figure 10F:
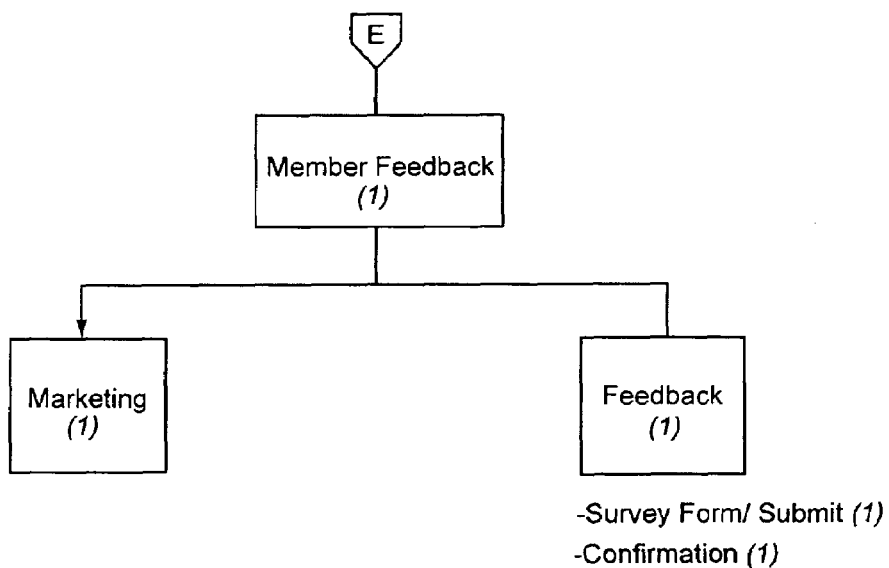
Figure 10G:
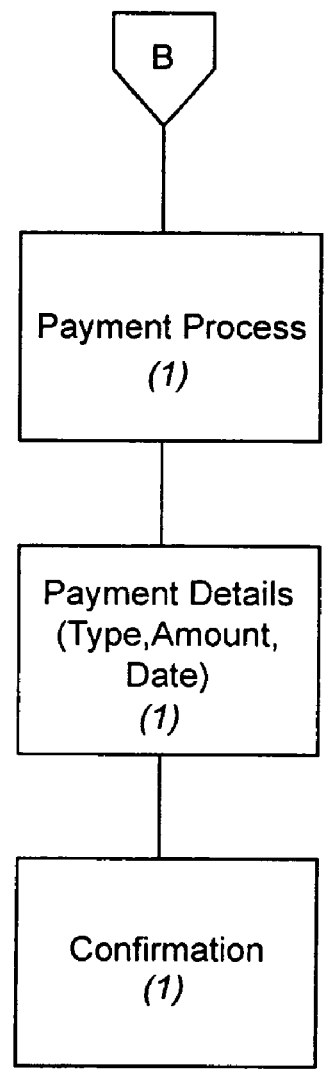
Figure 11A:
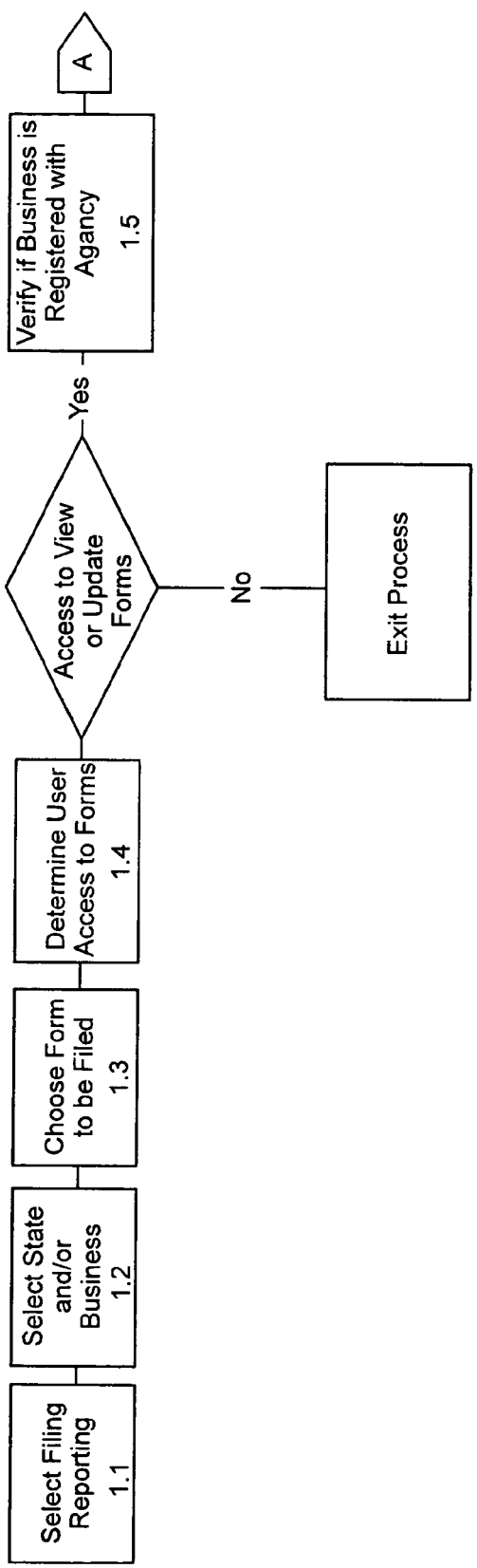
FIGS. 11A–11E are flow charts of the detailed processing associated with the filing and reporting system operation in accordance with a preferred embodiment.
Figure 11B:
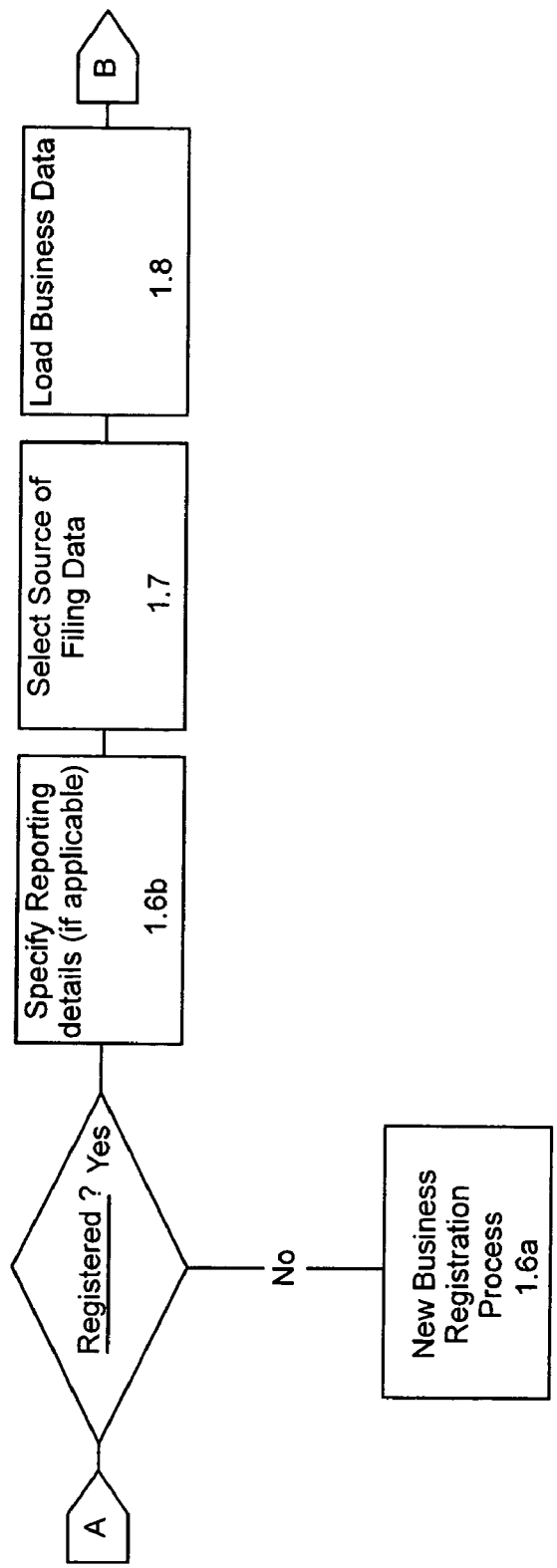
Figure 11C:
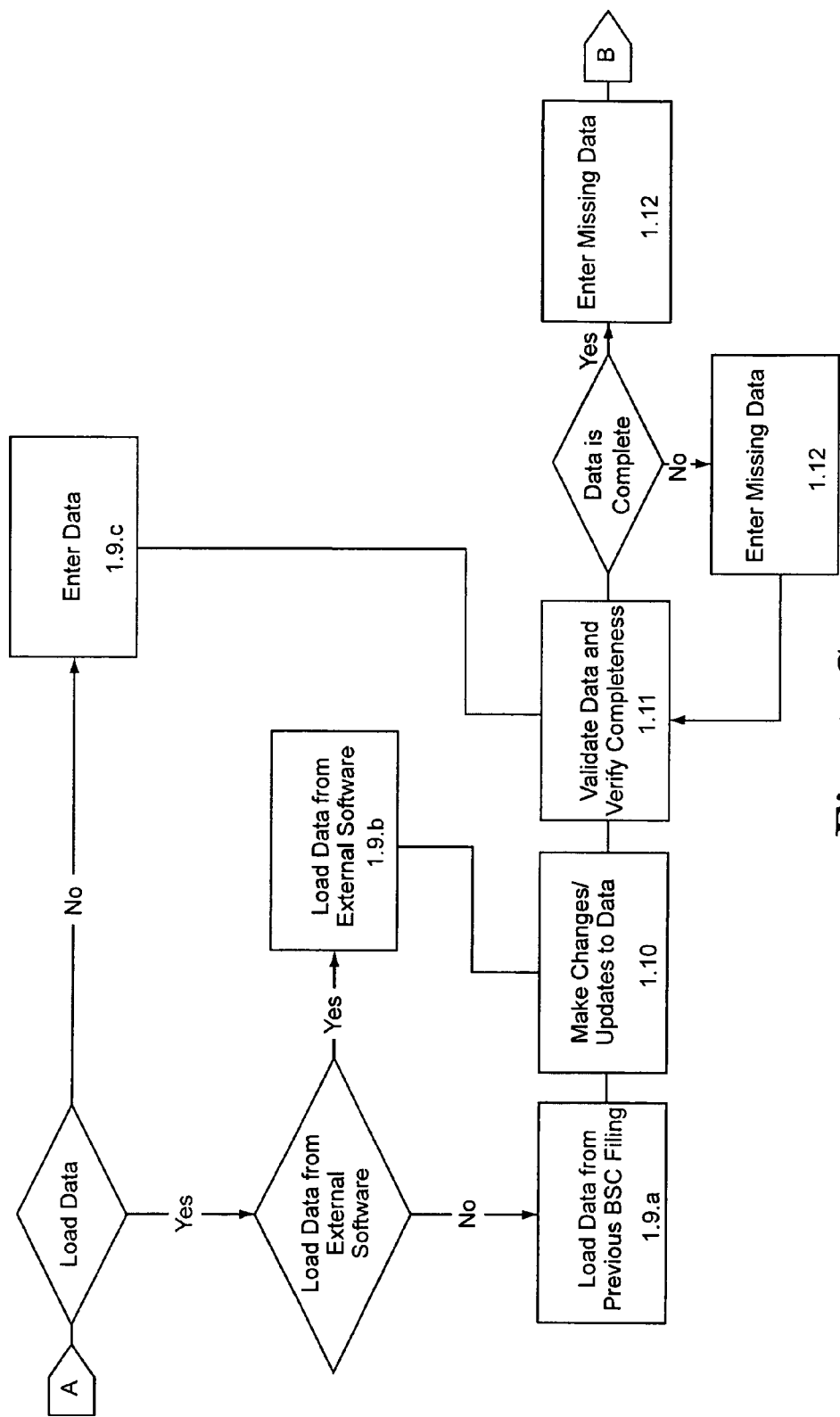
Figure 11D:
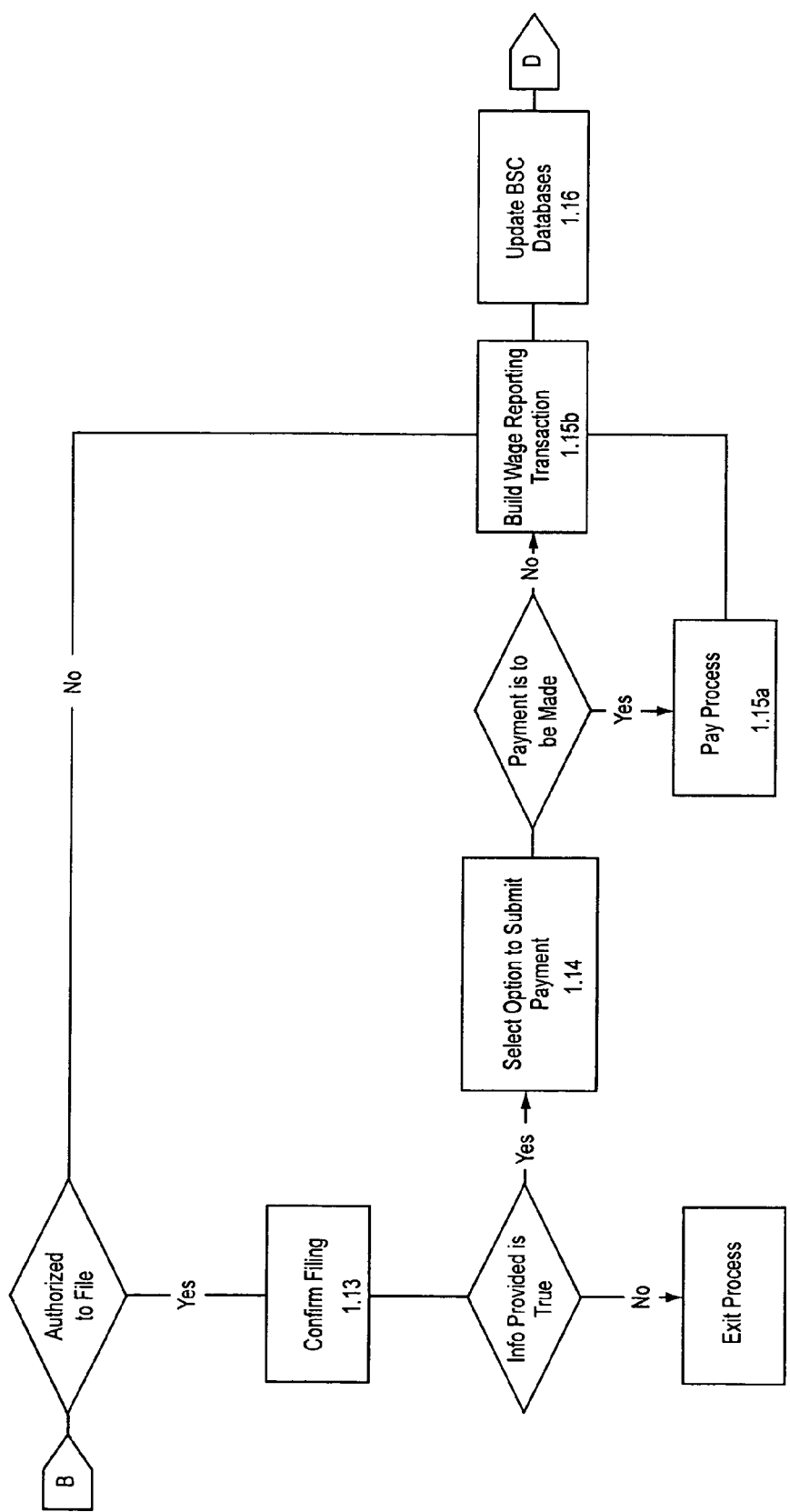
Figure 11E:
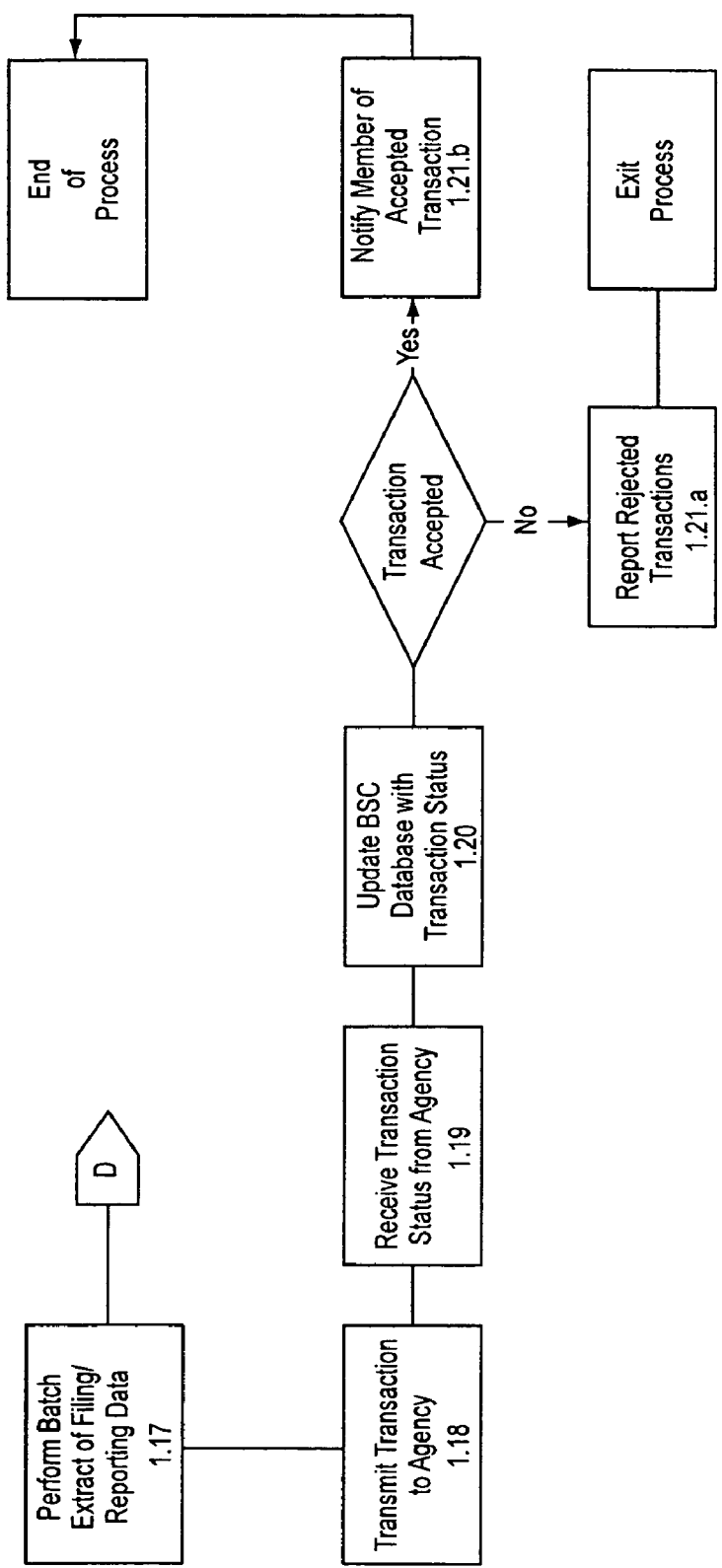

FIG. 9 is a functional block system architecture diagram flowchart in accordance with a preferred embodiment. Processing commences as a user logs and transmits critical information to the system for the purpose of determining if a session should be granted. The system gathers user logon information during this processing and to determine if a user wants to sign up for the governmental services. Then, the user is registered and the appropriate credentials for a user are prepared in accordance with a preferred embodiment. During this processing, the system authorizes the creation or revocation of a certificate for the user. This processing includes collecting user profile date, validating the format of the user data, checking the user data against appropriate criteria for verifying the user, approving or denying the user's application for membership, creating an appropriate message for approval of the application for membership to the user, creating shared secret information for authentication of the user, packaging and formatting the user profile data and packaging the database call parameters including: type of call, field names, table name and other user profile data. This processing includes authorizing the creation of a certificate which allows the user to obtain a key pair from a certificate authority. This is the point in the processing where the system determines the user is actually who they have said they are. Appropriate information is logged to an audit database and to the user profile database for future processing. FIGS. 10A–10G are flow charts of the detailed processing associated with the login and overall system operation in accordance with a preferred embodiment.

Next, a certificate is created for the user. This processing involves the creation and revocation of a public/private key pair and the corresponding issuance of a certificate to the user. The processing also provides the public key of a specified user upon request. To create the certificate, a transaction is sent to a certificate authority which handles the creation and revocation of a public/private key pair and the corresponding issuance of a certificate to the user and provides the public key of a specified user on request. The interface is also used to receive back the information about the user from the certificate authority and the corresponding certificate from the function that interfaces with the certificate authority. The database call parameters associated with this processing include type of call, field names, table name and other certificate authorization information. An appropriate approval of the user's application for membership including the user's secret must be transferred to the certificate authority. The user's public key must be received from the certificate authority and the database must be updated to reflect the new information. Finally, an audit database must be logged to facilitate high availability processing.

The user authentication and session initiation allows or denies a user access to the system and determines their level of access to information depending on established, predetermined criteria The user's signature is validated against the public key for the user that is maintained by the system. The technical aspects of this processing include the determination if the user is a current member, setting of session parameters, determining if user is already logged onto an existing session, resetting appropriate session parameters if an existing session is detected, building and submitting a database query to extract the authentication data from the database, packaging and sending the data result set and the user authentication is logged to the audit database.

The extract data function queries the database to retrieve a member's business information. The data read from the database depends on the type of transaction that a member initiates. Customization and content delivery data will also be extracted for the user interface.

The display transaction status and events is where the current status of the member's interaction with the system is displayed. The status of any pending or recently completed transactions or other business events is also displayed on an exception basis. This processing requires the system to format data for proper display and parse a data result set into data display widgets for ultimate processing. The next functional block collects and displays business information requested by the user. This processing includes prompting to determine which transactions the user desires to complete and what data is necessary to complete the transaction. The form in which may be HTML or an electronic version of a printed (government standard form).

Next, signed and unsigned data is packaged for entry into the database. The function ascertains whether the data to be sent to the database requires a digital signature from the user. Data for transactions that are time, content or sender sensitive must be signed so that the time of the transmission, the content of the transaction, and the identity of the sender can be verified. This includes all transactions that end up with government agencies such as wage filings. This function also packages data for members actions that modify their business records stored in the database without requiring a signature. These actions would typically consist of minor data updates that do not need to be transmitted to an external agency. FIG. 11A–11E are flow charts of the detailed processing associated with the filing and reporting system operation in accordance with a preferred embodiment.

An often used function is the verify and sign data function. This function is responsible for displaying the transaction information provided by a member in a form appropriate for digital signing and sends the packaged information for database updating if the member chooses to digitally sign the information. A hash code is computed as part of the encryption processing that utilizes the member's private key and transmits the information package to the system in accordance with a preferred embodiment. Another sub function is the update database function. This function encapsulates all functions related to creating or updating data in the database. The update data does not include updates to the audit database which are handled as a sequential, keyed access based on the time of the entry. A Structured Query Language (SQL) relational database is utilized to improve reporting and ease of query, however, one of ordinary skill in the art will readily comprehend that a network or hierarchical database can be readily substituted without undue experimentation and in accordance with the claimed invention.

The extract transactions function periodically checks for uncompleted transactions in the database and prepares/reformats the data for submittal to the appropriate external agency (governmental agency, EFT service provider or financial institution). The implementation of this function is as a series of batch applications that execute at specified times based on time schedules to request transaction information. The file transaction function handles the interface and communication with external agencies in accordance with a preferred embodiment. This utility is responsible for determining the appropriate routing for each transaction and the database. The implementation of this function is as a series of batch applications that execute at specified times based on time schedules to request transaction information. These batch functions are triggered by the extract transaction batch processes and packages pertinent EFT data and transmit same to the EFT function; package business data and transmit same to appropriate agencies; and package database call parameters to authenticate parties and log appropriate information.

The authenticate function mutually authenticates a system in accordance with a preferred embodiment to an agency and vice versa Pieces of this function reside both in the system and the agencies. As the system sends data to the agencies, the system may authenticate the agencies periodically to maintain secure communications. Various methods are used depending upon the particular agency involved, including: certificates, leased lines, and VPNs. The interface with the EFT or FI software facilitates the transmission of payment information to an agency (e.g., tax reporting, etc.). In such cases, the system (a) physically authenticates the electronic funds transfer service provider or a financial institution (i.e., bank) through the local software provided by the third party; and (b) sends the appropriate data required to the third party (i.e., account number).

The accept/receive response/confirm function receives all messages or responses from an agency. Anticipated information through this channel includes transmission status, transaction status, and notification of new events (such as a user claim filing). This function processes data that the user should is to be notified immediately. The function interprets and reformats data based upon type of responsePackage database call parameters, such as type of call, attribute names, table name and other formatted data. The extract notices on trigger function retrieves flagged data from the database about which a member should be notified immediately. This includes messages such as transmission failures for critical business transactions. The notify user directly alerts members of high priority messages associated with transactions. This is essentially a high priority "channel" for status data that is displayed when the user logs in (e.g., e-mail or beeper). Finally, the capture billing data function captures billing information for membership sign up and monthly charges for system services.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for electronically communicating with a plurality of government agencies in a business-to-government system comprising:
   (a) communicating with the plurality of government agencies by interacting with a user interface, the user interface in communication with the business-to-government system;
   (b) registering a system user, wherein a system user profile is created and a unique identifier is generated and associated with the system user;
   (c) receiving identification information from the system user such that the identification information is verified utilizing certificates, and associated with the unique identifier of the system user;
   (d) providing to the system user secured access, utilizing encryption, to a plurality of services upon verification of the identification information, wherein access to the plurality of services is limited based on the system user profile;
   (e) presenting to the user a customized user interface based on a region associated with the user's locale said region determining which government agencies with which to communicate and which sponsor information to display in the user interface;
   (f) managing transaction information from the system user, wherein the transaction information is processed to conform with standards from at least one of the plurality of government agencies, additional information is received from at least one of a previous government filing and the system user profile, and a report is prepared based on the transaction information and additional information received;
   (g) filing the report, wherein a receiving government agency is determined from among the plurality of government agencies, and the report is transmitted to the receiving government agency through a business-to-government interface, the business-to-government interface connecting the system user to the plurality of government agencies through a single communication portal;
   (h) tracking user transactions, wherein the user transactions include filing the report, and wherein a history of user transactions is stored such that the user can access the history; and
   (i) performing billing functions based on the user transactions.

2. The method of claim 1 wherein the system user profile includes demographic data.

3. The method of claim 1 wherein access to the plurality of services is limited based on a type of a business of the system user.

4. The method of claim 1 wherein the step of tracking user transactions includes monitoring user transactions via audit records to identify a government entity.

5. The method of claim 1 wherein the user interface is a graphical user interface.

6. The method of claim 1 wherein the user interface allows the system user to select the receiving government agency.

7. The method of claim 1 wherein the user interface displays state agency requirements associated with small businesses.

8. The method of claim 1 wherein the user interface provides a search engine for locating information required to address business problems.

9. The method of claim 1 wherein the step of tracking user transactions includes monitoring system parameters.

10. The method of claim 9 further comprising the step of determining whether the system parameters conform to a design of the business-to-government system.

11. The method of claim 1 further comprising the step of searching the user transactions for a pattern of abuse.

12. The method of claim 1 further comprising the step of reconstructing events of the business-to-government system based on the user transactions upon detection of a security problem.

13. The method of claim 1 wherein the step of providing secured access further includes preventing unauthorized modification of data by the system user.

14. The method of claim 1 further comprising the step of receiving an electronic payment from the system user.

15. The method of claim 14 further comprising the step of routing the electronic payment to the receiving government agency.

16. The method of claim 1 wherein the step of filing the report includes routing the report to the receiving government agency from among the plurality of government agencies.

17. The method of claim 1 further comprising the step of sending a confirmation of receipt of the report by the receiving government agency to the system user.

18. The method of claim 17 wherein the step of sending the confirmation includes confirming compliance with standards of the receiving government agency.

19. The method of claim 1 further comprising the step of employing forensic analytical tools for determining a source cause for poor behavior of the online system.

20. The method of claim 1 wherein the report includes tax information.

21. The method of claim 1 further comprising the step of determining a mode of communication based on the requirements of the receiving government agency and based on the transaction information.

22. The method of claim 21 wherein the transaction information includes at least one of unemployment insurance tax payments data, employee wages data, sales tax returns data, withholding tax returns data, business registrations data, and permits and licenses data.

23. The method of claim 21 wherein the transaction information includes at least one of notifications of unemployment claims, new hire filings, and worker's compensation filings.

24. The method of claim 21 wherein the transaction information includes filings required by at least one of the Environmental Protection Agency and the Occupational Safety and Health Agency.

25. The method of claim 21 wherein the mode of communication includes at least one of a format of the report and a data structure of the processed transaction Information.

26. The method of claim 1 wherein the report is filed with more than one of the plurality of government agencies.

27. The method of claim 1 wherein the user interface can be further customized by the user.

28. The method of claim 1 wherein the display of sponsor information is dependent on the plurality of government agencies displayed to the user.

* * * * *